United States Patent
Sun

(10) Patent No.: US 12,431,495 B2
(45) Date of Patent: Sep. 30, 2025

(54) POSITIVE ELECTRODE ACTIVE MATERIAL HAVING SURFACE PORTION DOPED WITH HETERO ELEMENTS, AND METHOD FOR PRODUCING SAME

(71) Applicant: IUCF-HYU (INDUSTRY-UNIVERSITY COOPERATION FOUNDATION HANYANG UNIVERSITY), Seoul (KR)

(72) Inventor: Yang-Kook Sun, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 762 days.

(21) Appl. No.: 17/596,792

(22) PCT Filed: Jun. 19, 2020

(86) PCT No.: PCT/KR2020/007976
§ 371 (c)(1),
(2) Date: Dec. 17, 2021

(87) PCT Pub. No.: WO2020/256473
PCT Pub. Date: Dec. 24, 2020

(65) Prior Publication Data
US 2022/0328821 A1 Oct. 13, 2022

(30) Foreign Application Priority Data

Jun. 20, 2019 (KR) .................... 10-2019-0073581
Jun. 19, 2020 (KR) .................... 10-2020-0074867

(51) Int. Cl.
*H01M 4/525* (2010.01)
*C01G 53/40* (2025.01)
(Continued)

(52) U.S. Cl.
CPC ............ *H01M 4/525* (2013.01); *C01G 53/40* (2013.01); *C01G 53/50* (2013.01); *H01M 4/366* (2013.01);
(Continued)

(58) Field of Classification Search
CPC .. H01M 10/0525; H01M 4/366; H01M 4/525; H01M 4/382
See application file for complete search history.

(56) References Cited

U.S. PATENT DOCUMENTS

| 2013/0202966 A1* | 8/2013 | Yu | H01M 4/505 429/223 |
| 2015/0357638 A1* | 12/2015 | Sun | H01M 4/366 429/231.95 |
| 2018/0013129 A1* | 1/2018 | Lee | H01M 4/366 |

FOREIGN PATENT DOCUMENTS

| KR | 10-1326088 B1 | 11/2013 |
| KR | 10-2014-0119621 A | 9/2014 |

(Continued)

OTHER PUBLICATIONS

Chong S. Yoon et al., "Cation Ordering of Zr-Doped LiNiO2 Cathode for Lithium-Ion Batteries", Chemistry of Materials, 2018, pp. 1808-1814, vol. 30.
(Continued)

*Primary Examiner* — Kenneth J Douyette
(74) *Attorney, Agent, or Firm* — Sughrue Mion, PLLC

(57) ABSTRACT

The present invention pertains to: a positive electrode active material precursor containing first secondary particle composed of an aggregate of a plurality of first primary particles,
(Continued)

the positive electrode active material precursor including a first center portion represented by chemical formula 1 and a first surface portion represented by chemical formula 2, wherein the thickness of the first surface portion is 2-20% of the average radius of the positive electrode active material precursor; and a positive electrode active material containing the positive electrode active material precursor.

17 Claims, 19 Drawing Sheets

(51) Int. Cl.
    *C01G 53/50*     (2025.01)
    *H01M 4/36*     (2006.01)
    *H01M 4/38*     (2006.01)
    *H01M 4/50*     (2010.01)
    *H01M 4/505*     (2010.01)
    *H01M 10/052*     (2010.01)
    *H01M 4/02*     (2006.01)

(52) U.S. Cl.
    CPC ........... *H01M 4/382* (2013.01); *H01M 4/505* (2013.01); *H01M 10/052* (2013.01); *C01P 2002/52* (2013.01); *C01P 2004/03* (2013.01); *C01P 2004/04* (2013.01); *C01P 2004/50* (2013.01); *C01P 2004/84* (2013.01); *C01P 2006/40* (2013.01); *H01M 2004/028* (2013.01)

(56) References Cited

FOREIGN PATENT DOCUMENTS

| KR | 10-1555594 B1 | 10/2015 |
|---|---|---|
| KR | 10-1676687 B1 | 11/2016 |
| KR | 10-2016-0149162 A | 12/2016 |
| KR | 10-2017-0138489 A | 12/2017 |
| KR | 10-1808373 B1 | 12/2017 |
| KR | 10-2018-0099542 A | 9/2018 |
| KR | 10-1928631 B1 | 12/2018 |
| KR | 10-2019-0008156 A | 1/2019 |

OTHER PUBLICATIONS

Gang Sun et al., "The effect of cation mixing controlled by thermal treatment duration on the electrochemical stability of lithium transition-metal oxides", Phys. Chem. Chem. Phys., 2017, pp. 29886-29894, vol. 19.

International Search Report for PCT/KR2020/007976 dated, Sep. 23, 2020 (PCT/ISA/210).

Communication dated Jan. 7, 2022 from the Korean Intellectual Property Office in Application No. 10-2020-0074867.

* cited by examiner

[FIG. 1a]
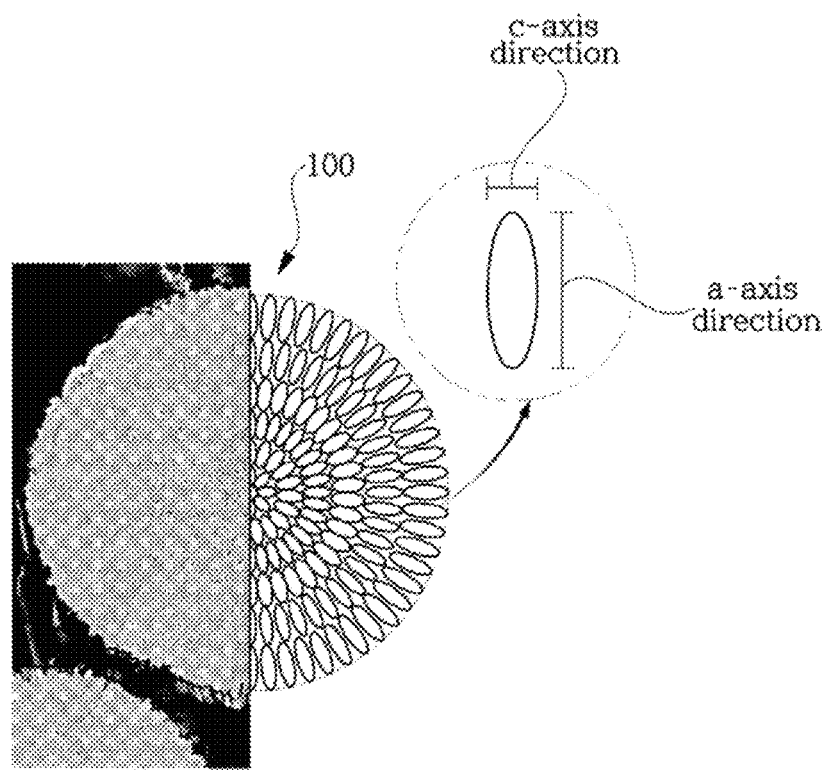
[FIG. 1b]
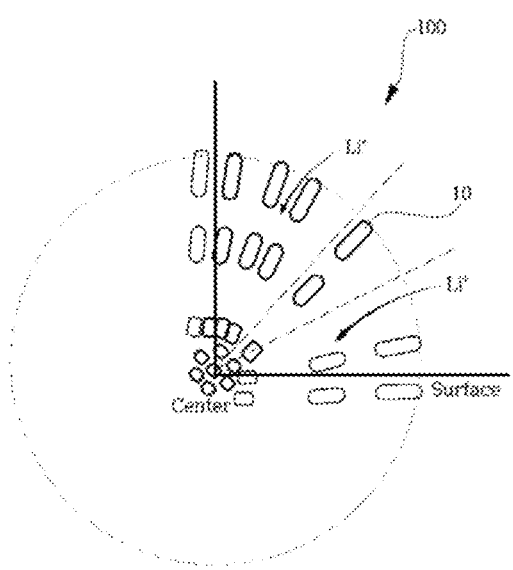

[FIG. 2a]
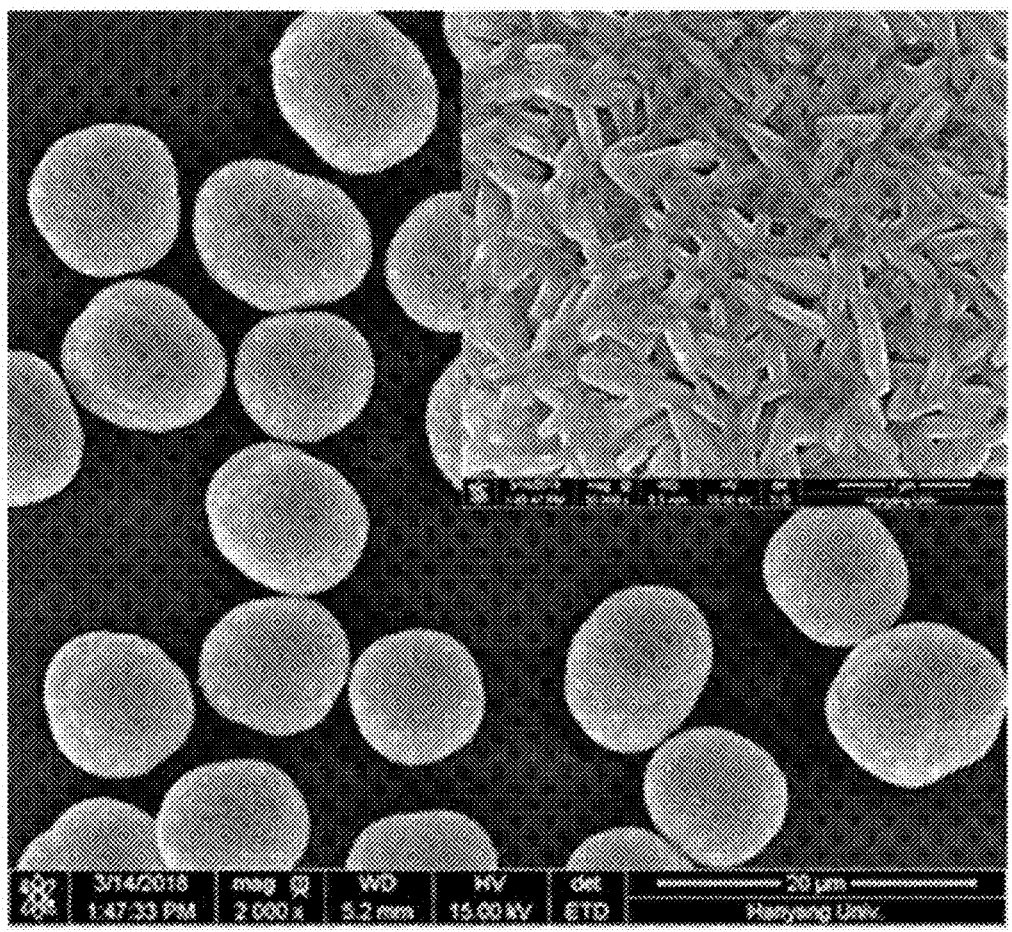

[FIG. 2b]
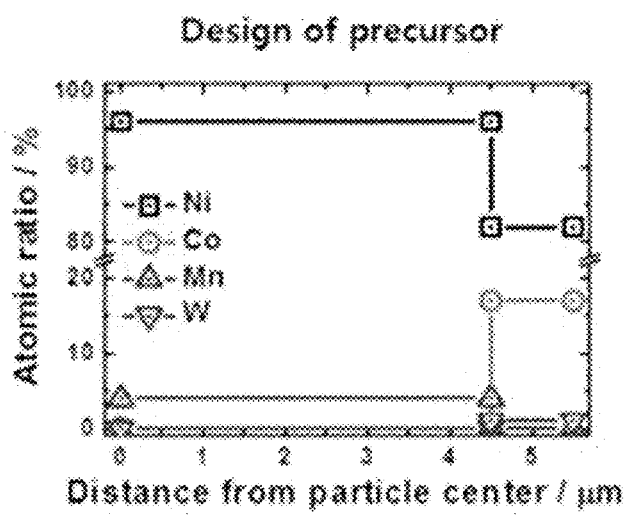
[FIG. 2c]
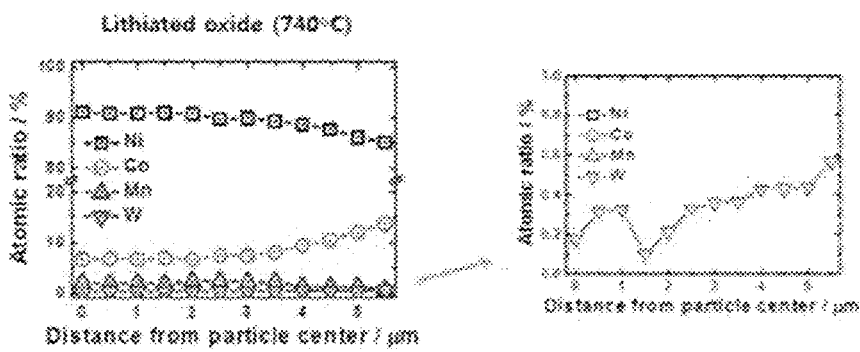

[FIG. 3]
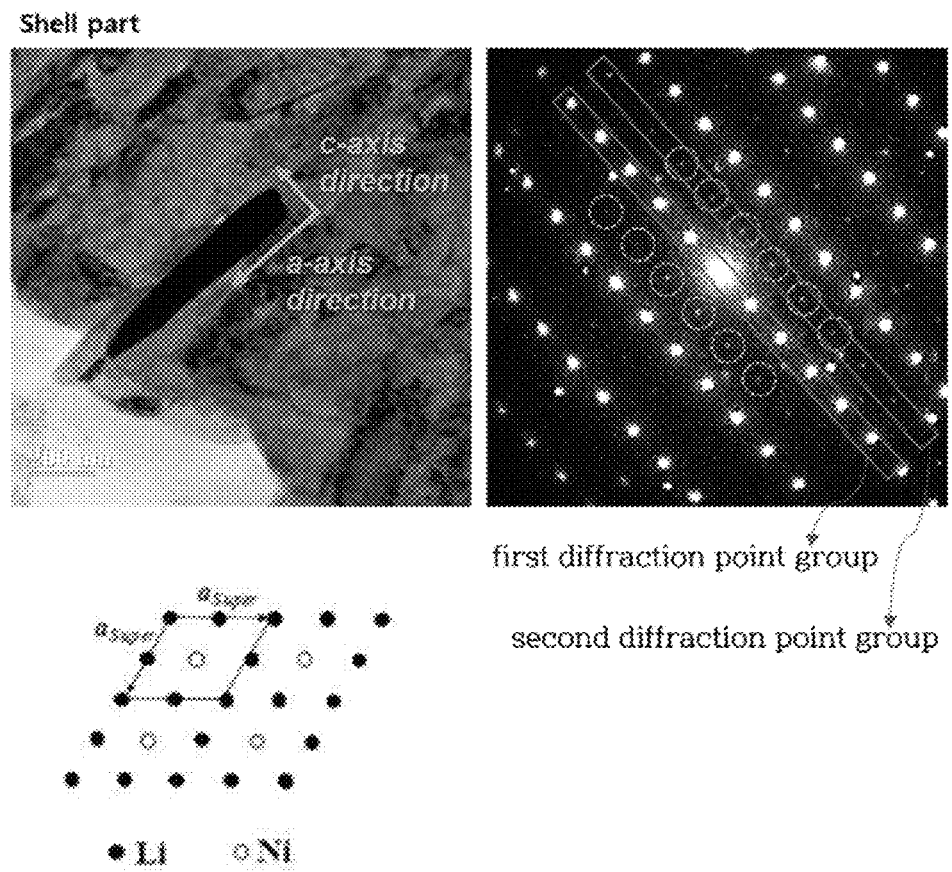
[FIG. 4]
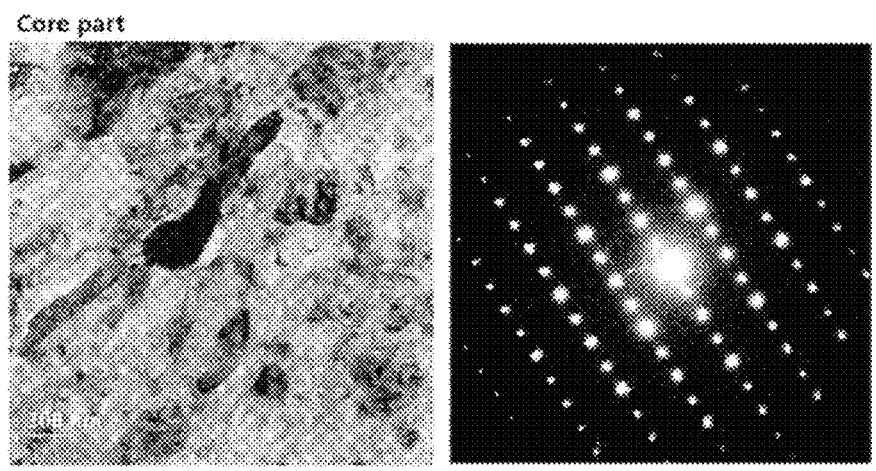

[FIG. 5]
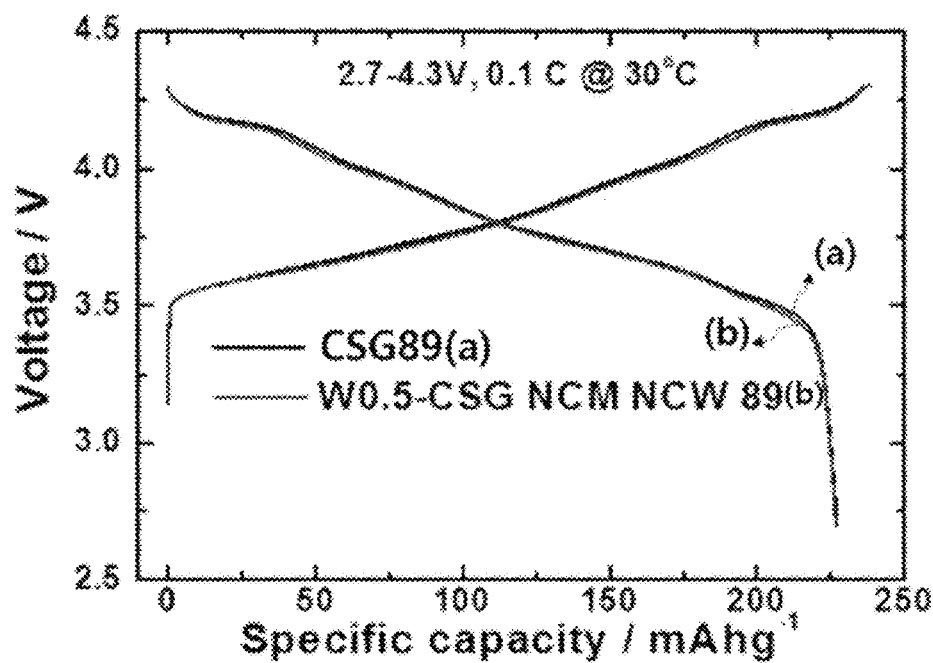
[FIG. 6]
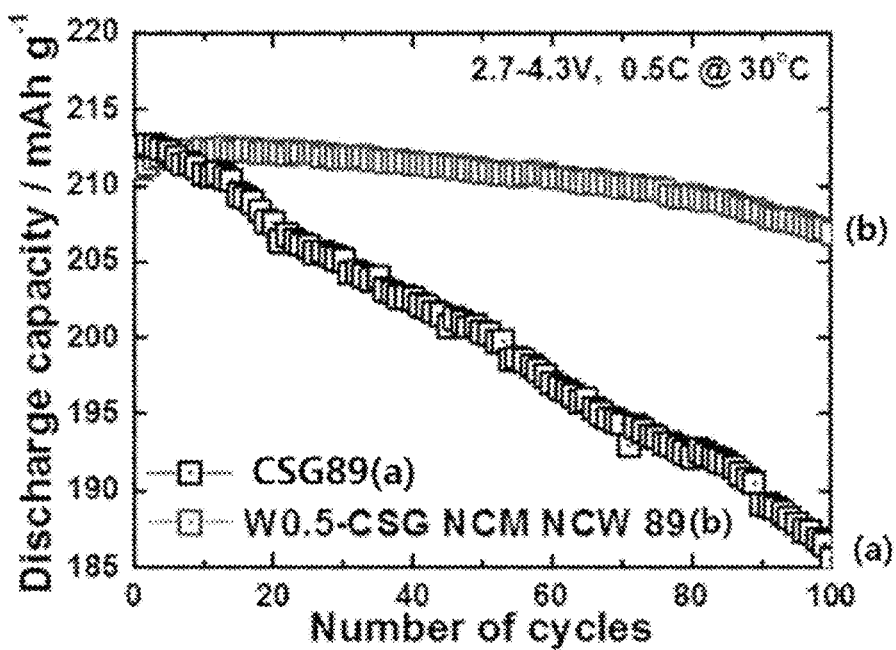

[FIG. 7]
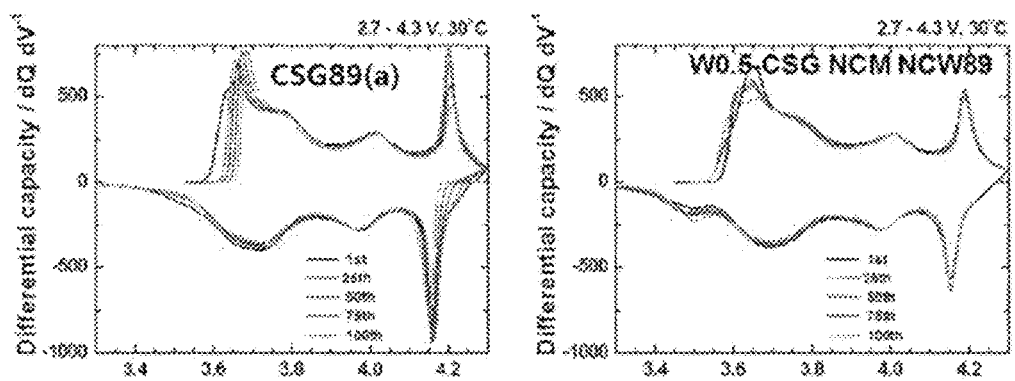
[FIG. 8]
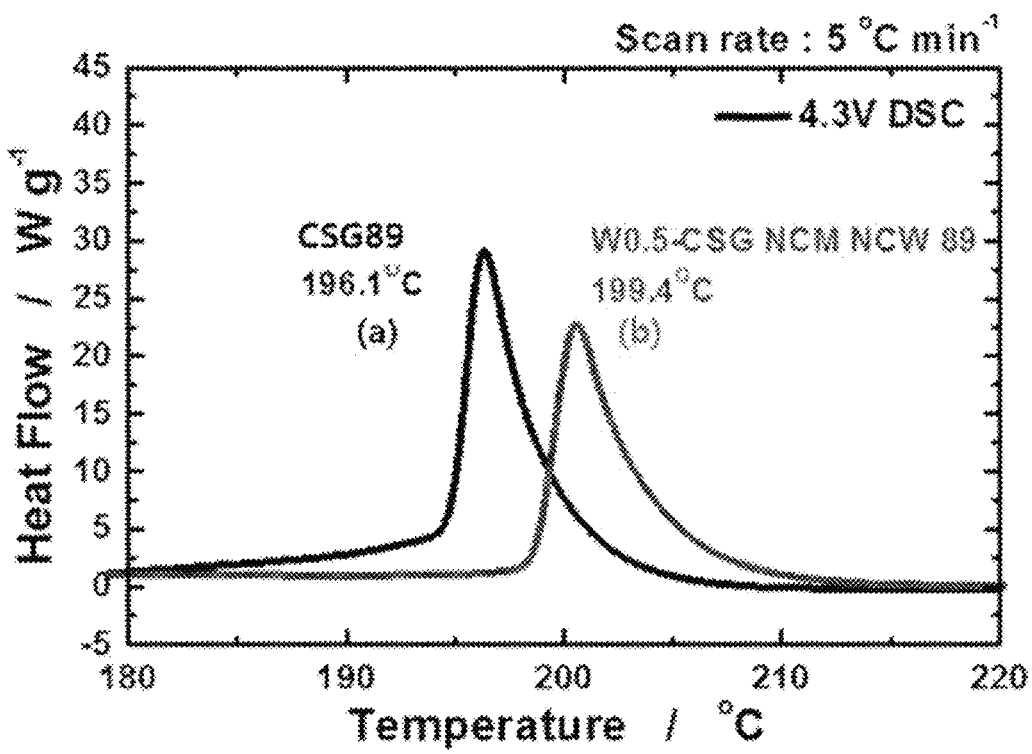

[FIG. 9]
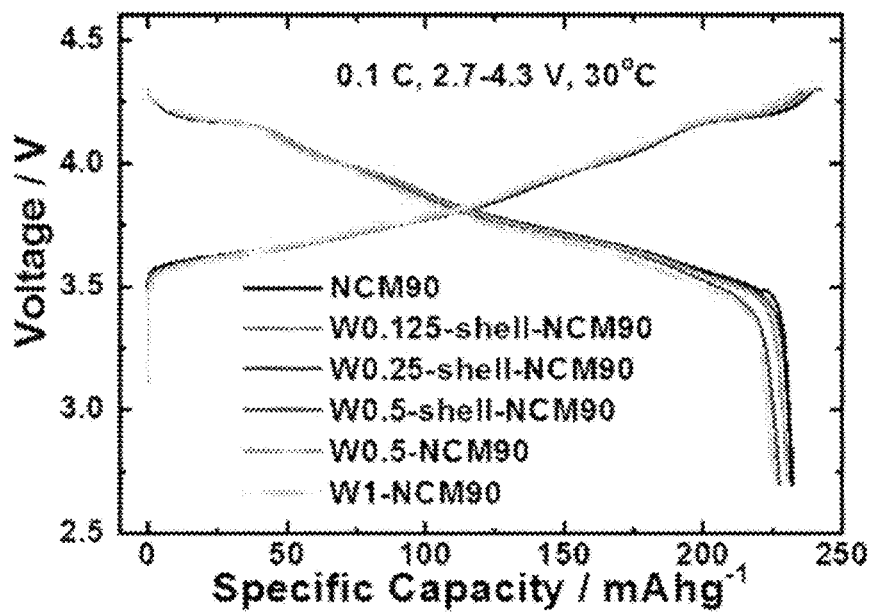
[FIG. 10]
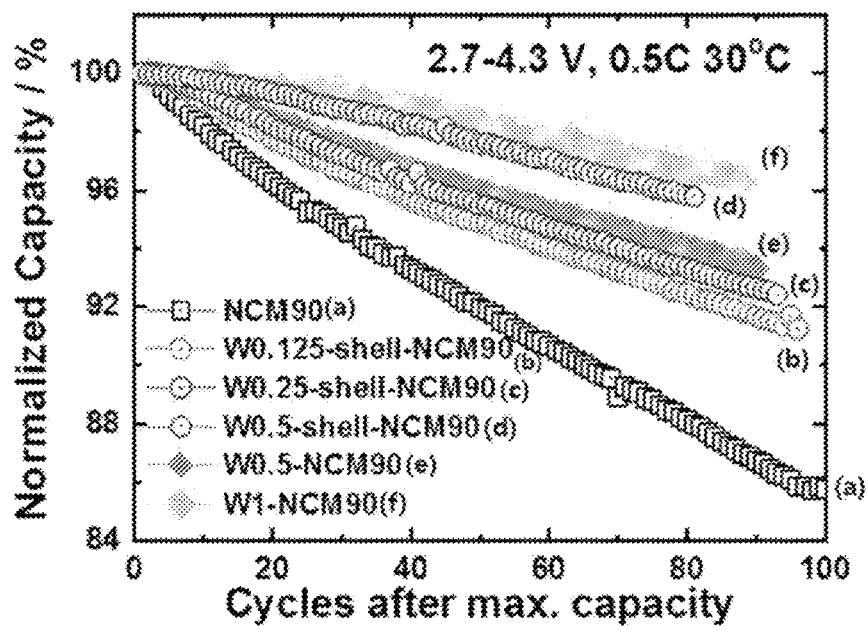

[FIG. 11]
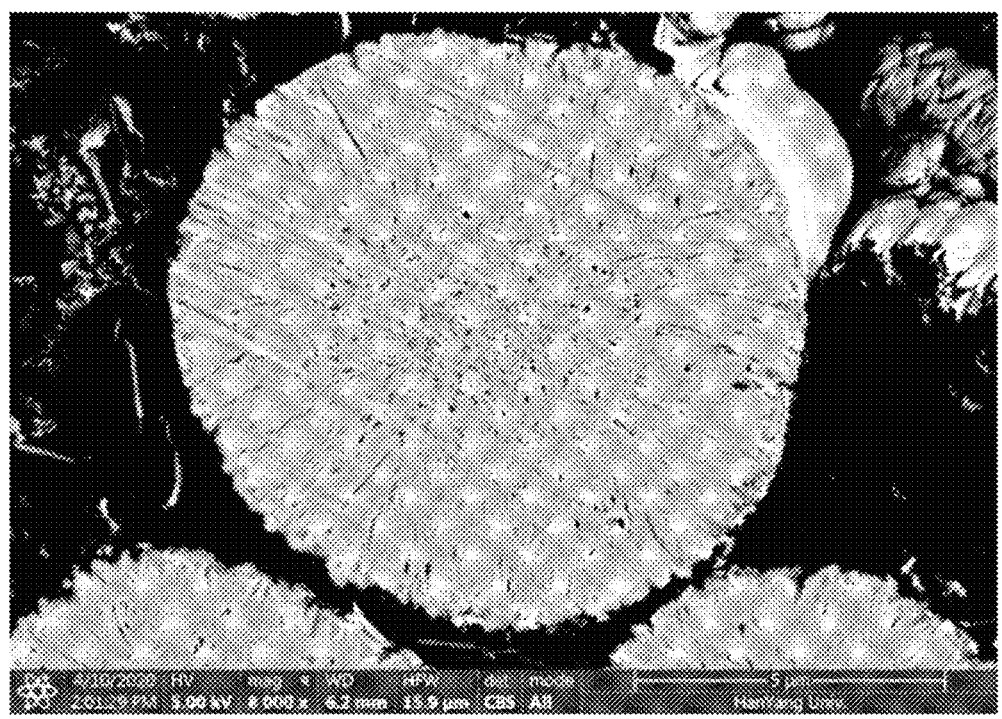

[FIG. 13]
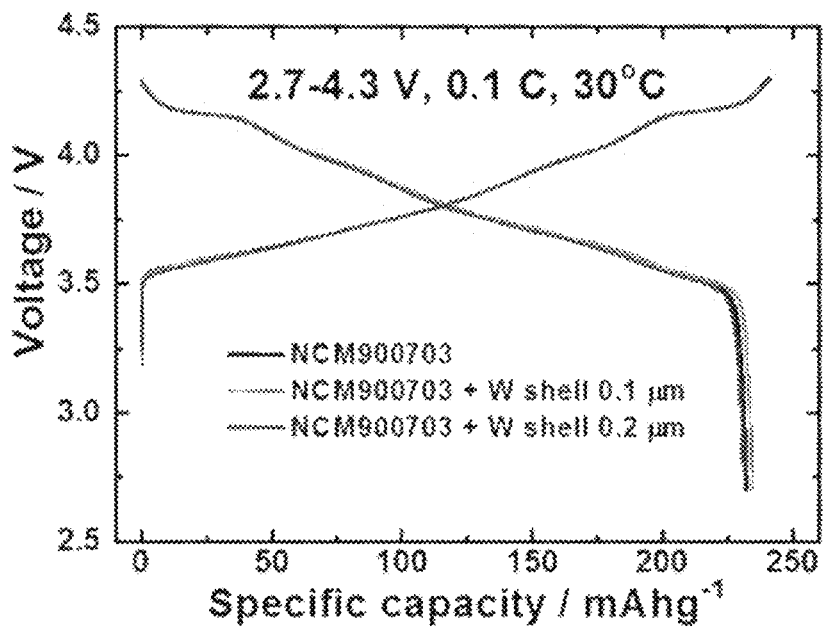
[FIG. 14]
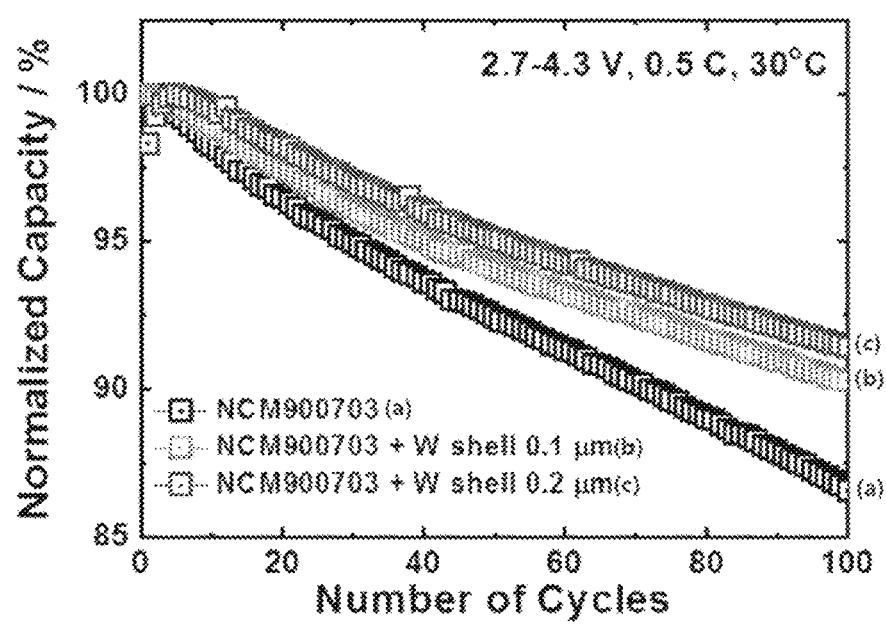

[FIG. 15]
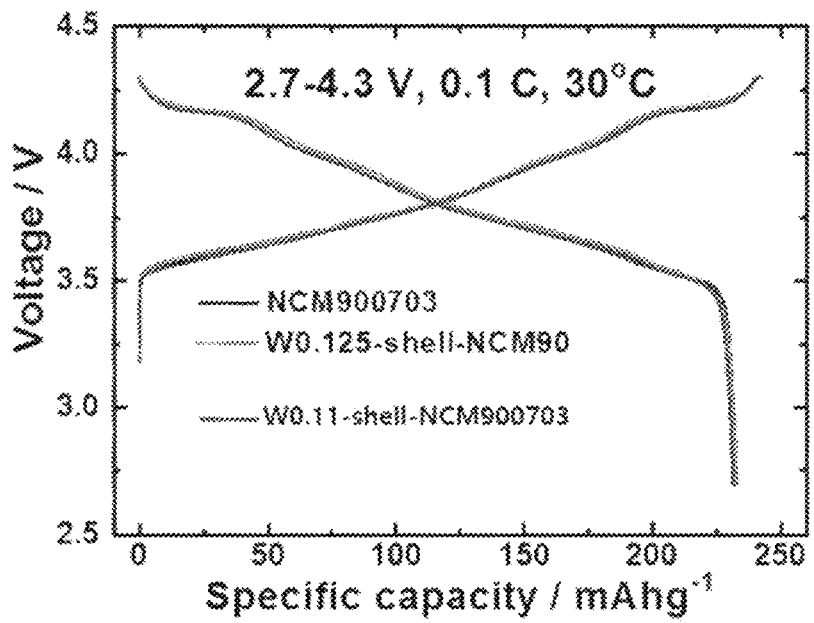
[FIG. 16]
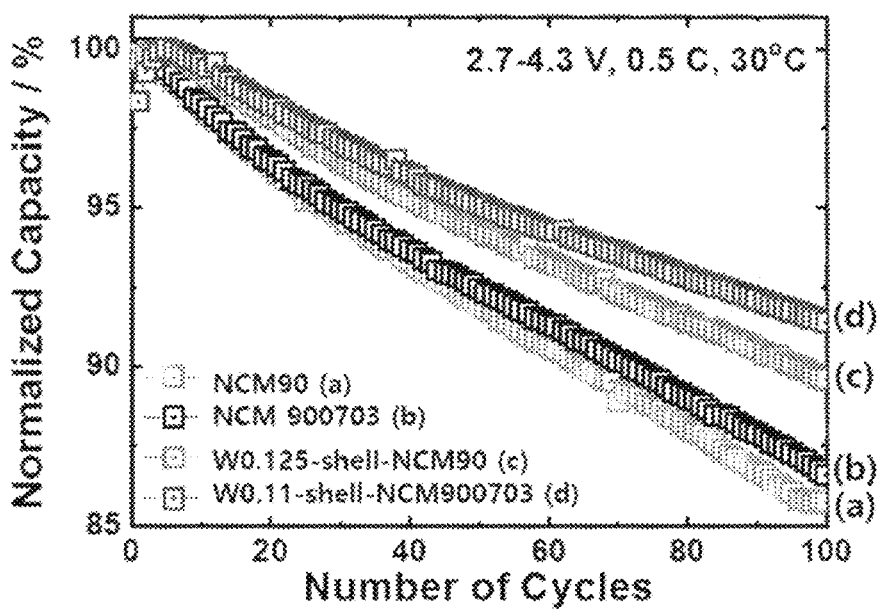

[FIG. 17]
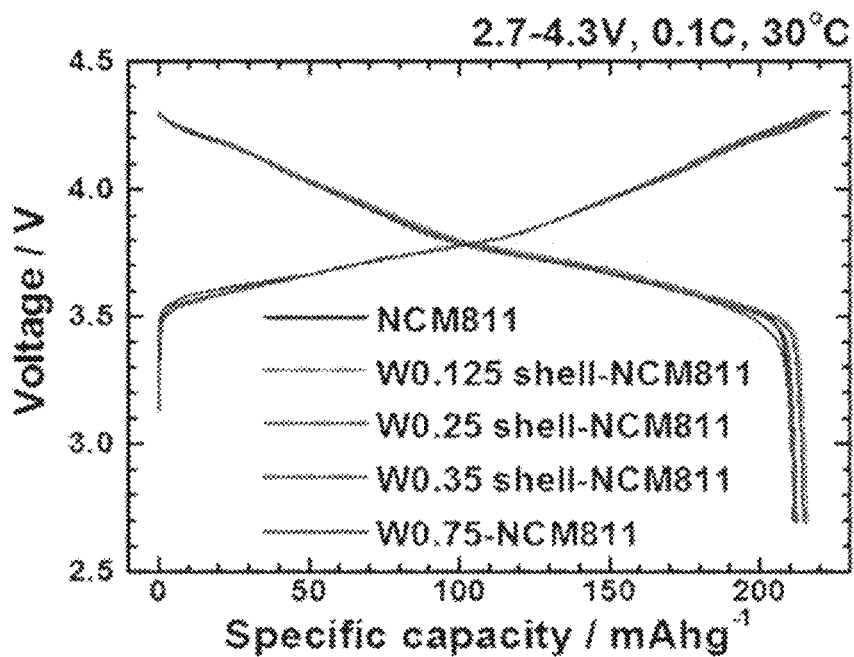
[FIG. 18]
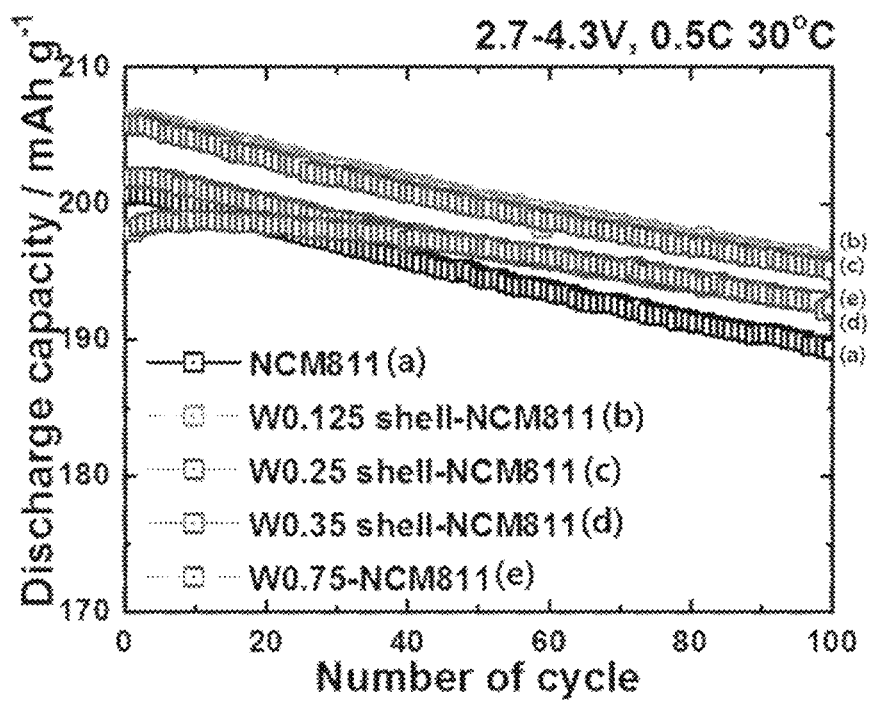

[FIG. 19]
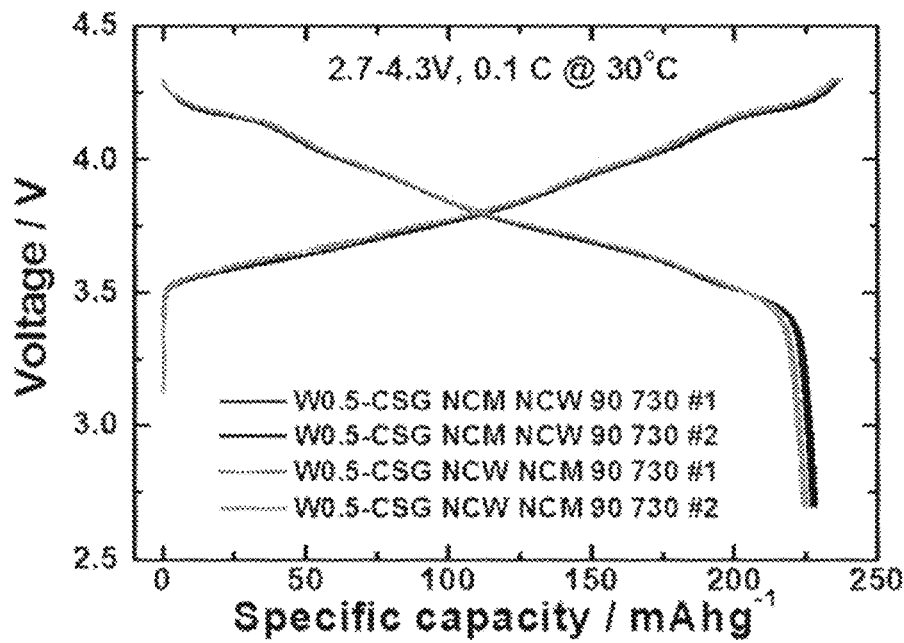
[FIG. 20]
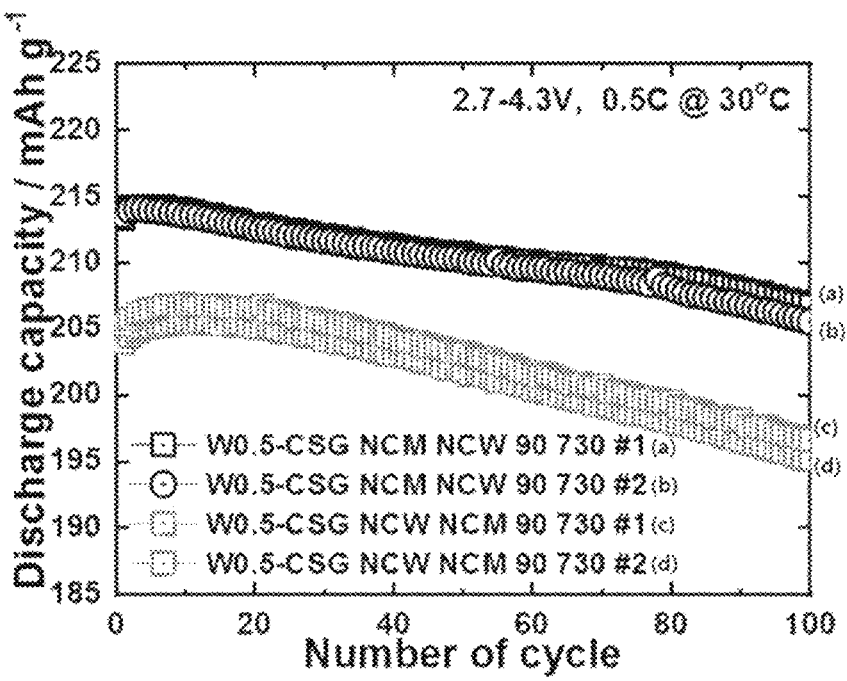

[FIG. 21]
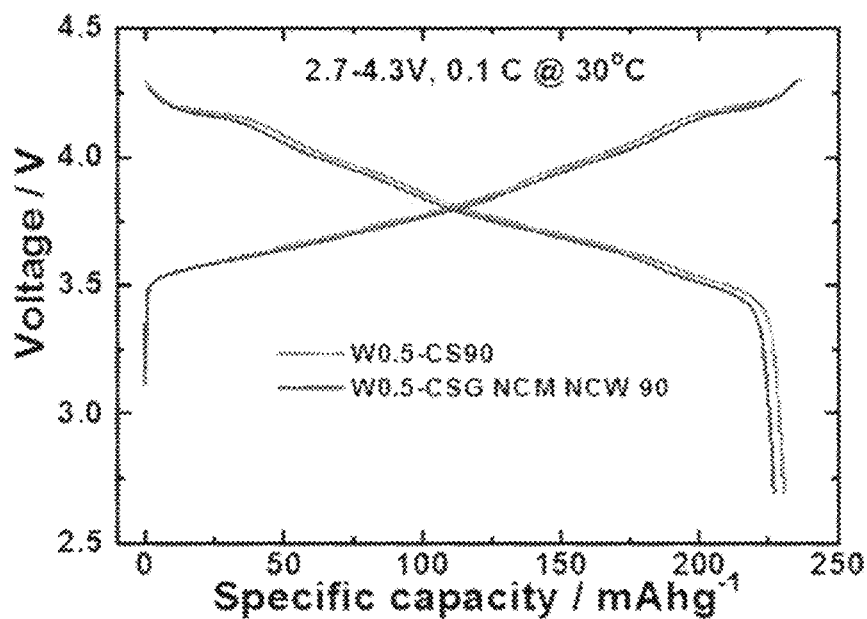
[FIG. 22]
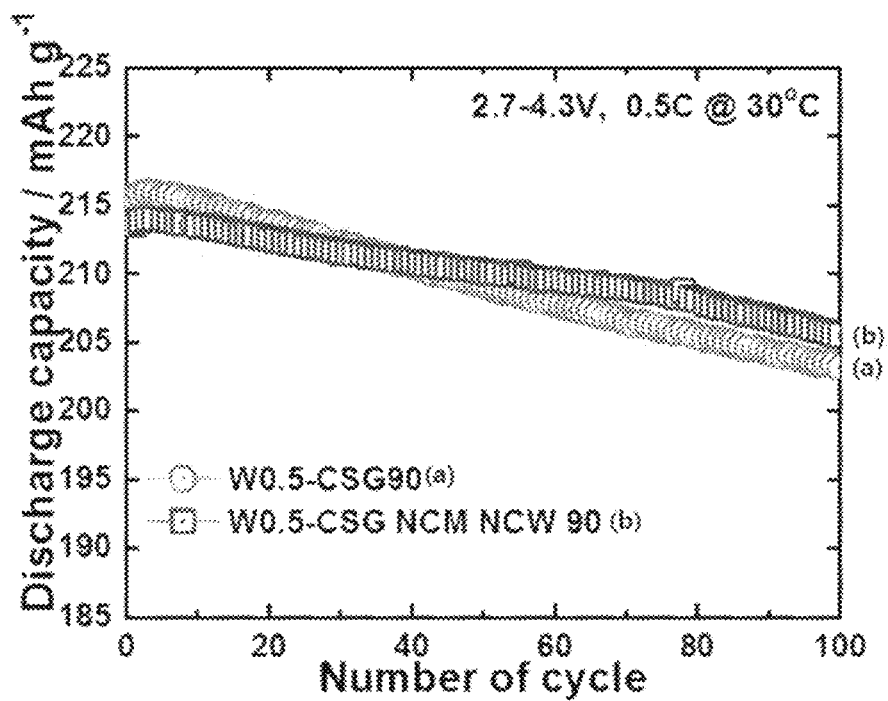

[FIG. 23]
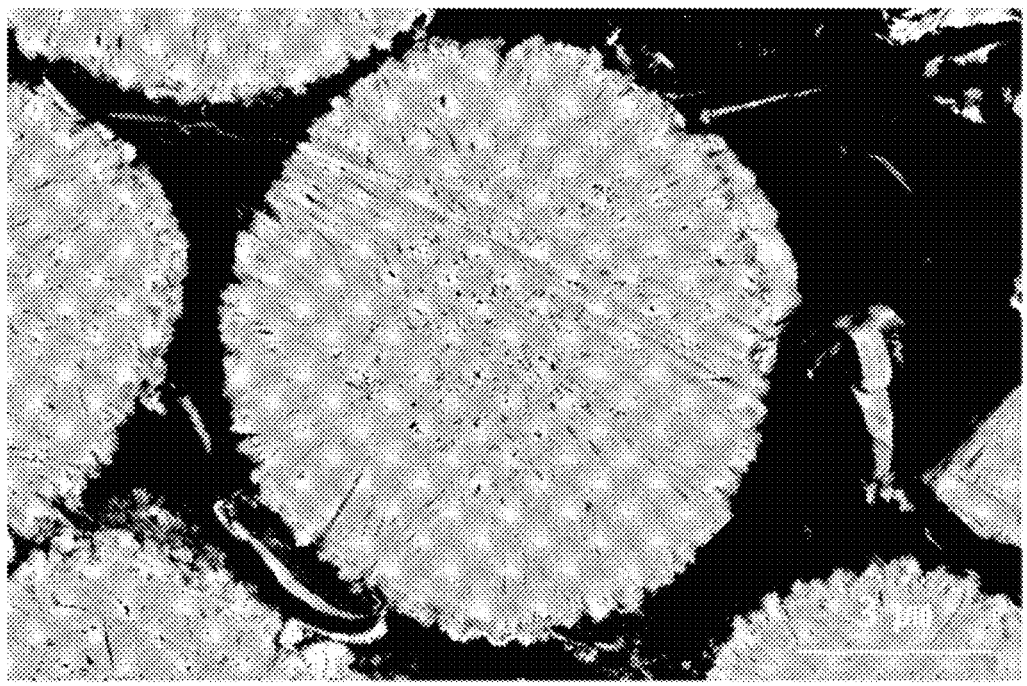
[FIG. 24]
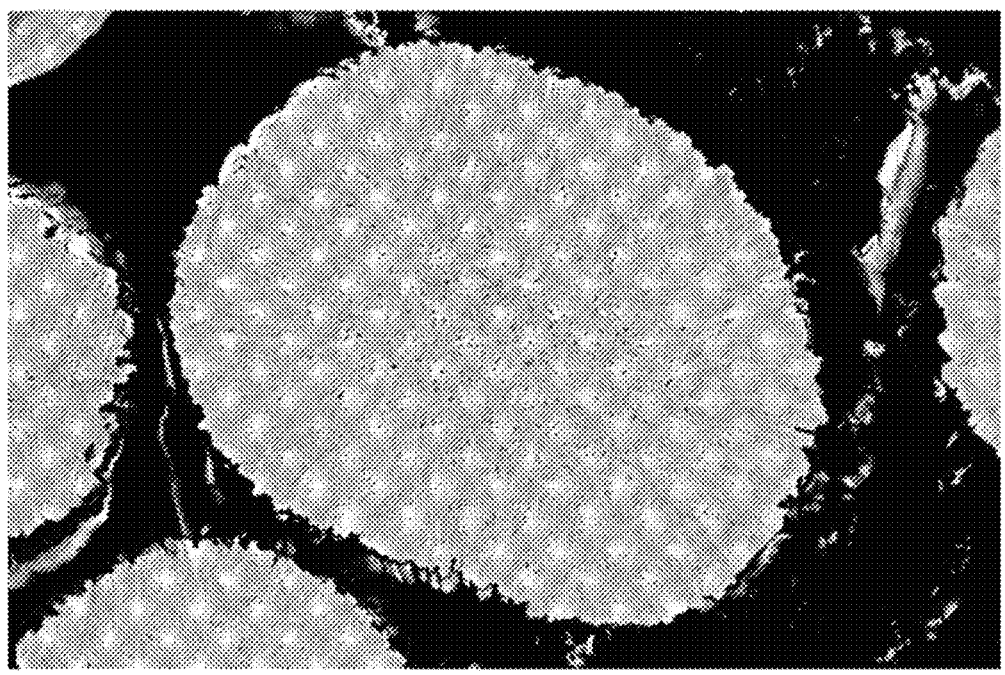

[FIG. 25a]
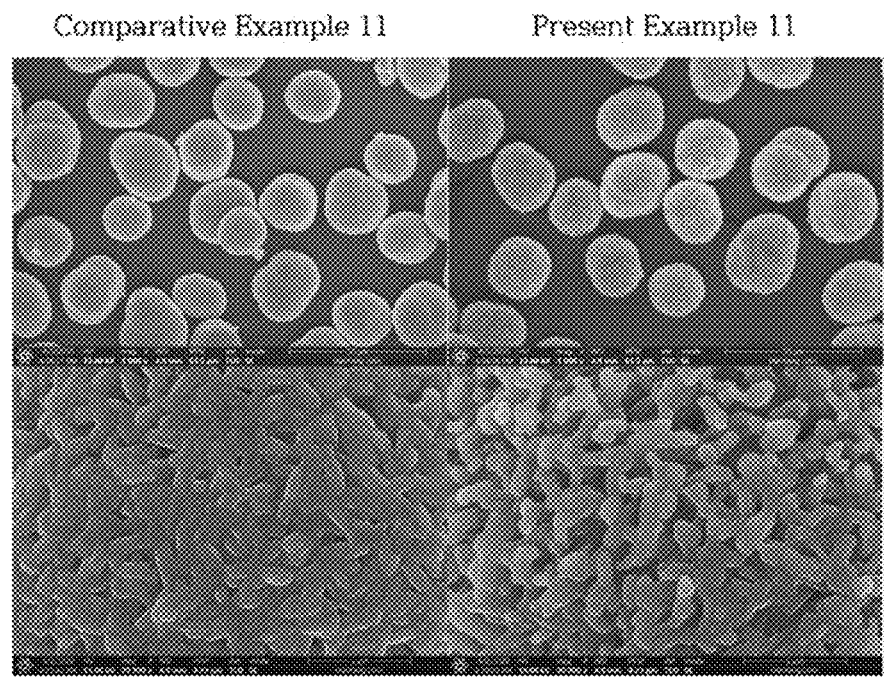

[FIG. 25b]
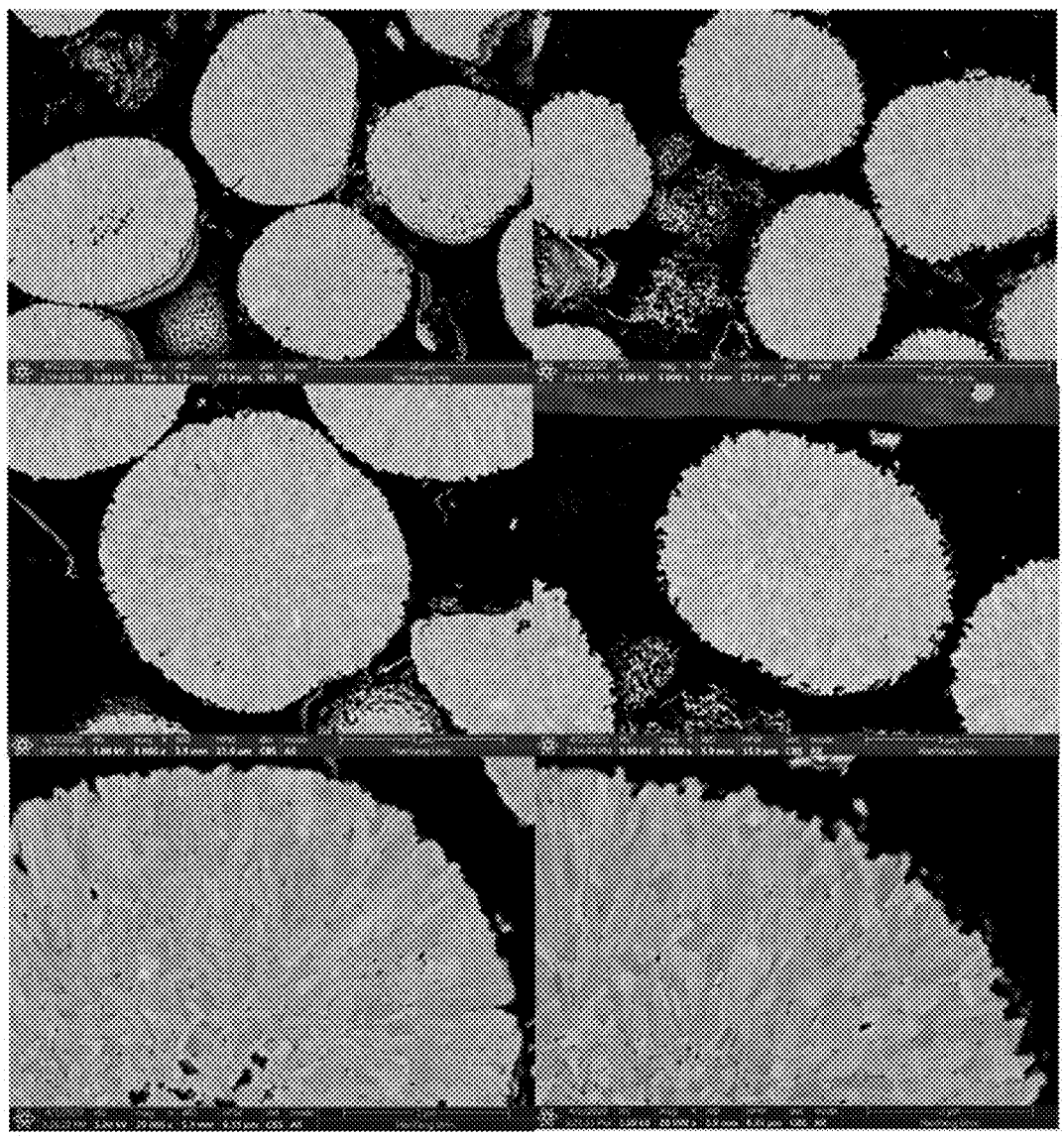

【FIG. 26】
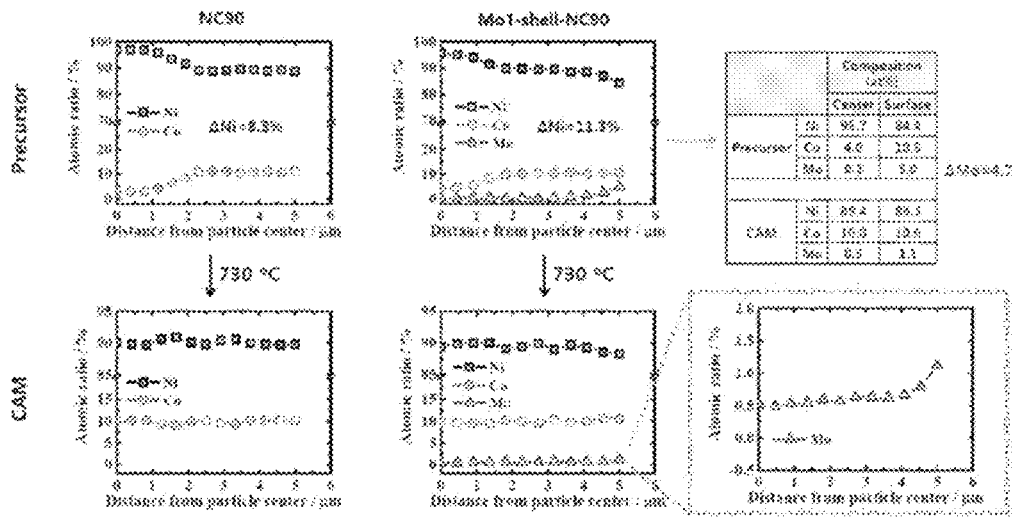
【FIG. 27】
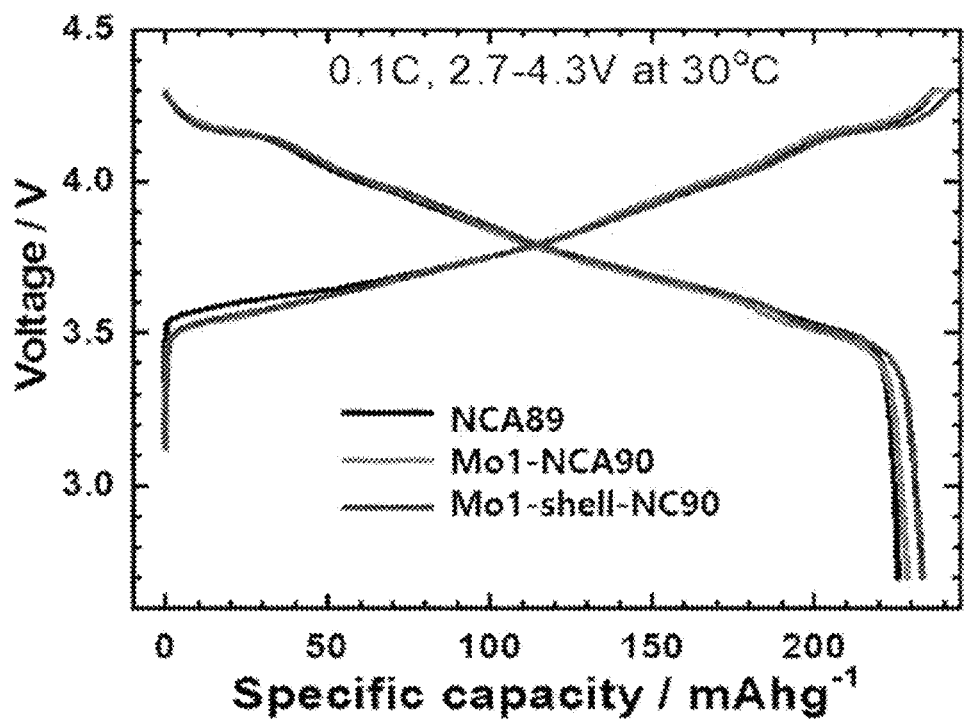

[FIG. 28]
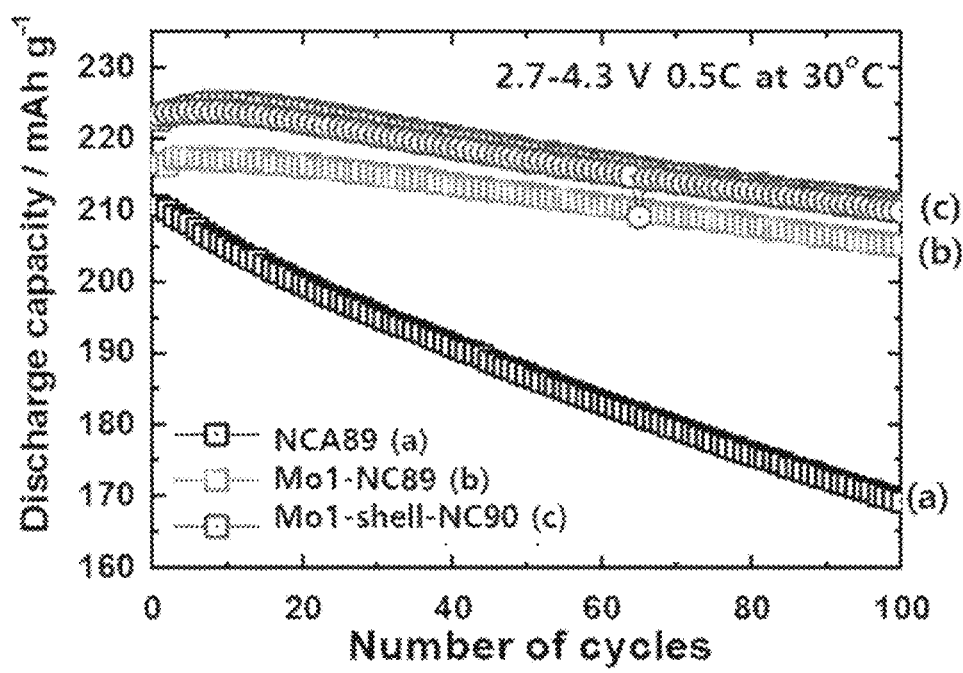

POSITIVE ELECTRODE ACTIVE MATERIAL HAVING SURFACE PORTION DOPED WITH HETERO ELEMENTS, AND METHOD FOR PRODUCING SAME

CROSS REFERENCE TO RELATED APPLICATIONS

This application is a National Stage of International Application No. PCT/KR2020/007976 filed Jun. 19, 2020, claiming priority based on Korean Patent Application No. 10-2019-0073581 filed Jun. 20, 2019 and Korean Patent Application No 10-2020-0074867 filed Jun. 19, 2020.

FIELD

The present disclosure relates to a positive electrode active material and a method for producing the same. More specifically, the present disclosure relates to a positive electrode active material having a surface portion doped with hetero elements, a method for producing the same, and a lithium secondary battery including the same.

DESCRIPTION OF RELATED ART

With development of portable mobile electronic devices such as smart phones, MP3 players, and tablet PCs, the demand for secondary batteries capable of storing electrical energy is increasing explosively. In particular, with the advent of electric vehicles, medium and large sized energy storage systems, and portable devices requiring high energy density, the demand for lithium secondary batteries is increasing.

With the increase in demand for lithium secondary batteries, various research and development are being conducted to improve characteristics of positive electrode active materials used in lithium secondary batteries. For example, in Korean Patent Application Publication No. 10-2014-0119621 (Application No. 10-2013-0150315), a secondary battery having high voltage capacity and long life characteristics is disclosed in which a precursor for production of a lithium-rich positive electrode active material is used, and a type and a composition of a metal substituted in the precursor are controlled, a type and an amount of an added metal are controlled.

DISCLOSURE

Technical Purposes

One technical purpose to be achieved by the present disclosure is to provide a high-capacity positive electrode active material with improved lifespan characteristics and capacity characteristics, the material including a high content of nickel, a method for producing the same, and a lithium secondary battery including the same.

Another technical purpose that the present disclosure seeks to achieve is to provide a long-life positive electrode active material as produced using a novel method such that a crystal structure of a surface portion of the positive electrode active material is different from that of a center portion thereof, a method for producing the same, and a lithium secondary battery including the same.

Another technical purpose to be achieved by the present disclosure is to provide a high-stability positive electrode active material, a method for producing the same, and a lithium secondary battery including the same.

Another technical purpose to be achieved by the present disclosure is to provide a positive electrode active material that has a high discharge capacity and at the same time has minimized lifespan deterioration depending on the number of charge/discharge, a method for producing the same, and a lithium secondary battery including the same.

The technical purpose to be achieved by the present disclosure is not limited to the above purposes.

Technical Solutions

One aspect of the present disclosure provides a positive electrode active material precursor including a first secondary particle as an aggregate of a plurality of first primary particles, wherein the positive electrode active material precursor includes a first center portion made of a material represented by a following Chemical Formula 1, and a first surface portion made of a material represented by the following Chemical Formula 2, wherein a percentage of a thickness of the first surface portion with respect to an average radius of the positive electrode active material precursor is in a range of 2% to 20%:

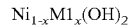 <Chemical Formula 1>

 <Chemical Formula 2> where M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V), titanium (Ti) or mixtures thereof, $0 \leq x \leq 0.2$, $0 \leq y \leq 0.2$, and $0.005 \leq z \leq 0.1$.

In one implementation of the positive electrode active material precursor, a length in an a-axis direction of each of the first primary particles different from a length in a c-axis direction thereof, wherein a length in the a-axis direction of each of the first primary particles disposed in the first surface portion is larger than a length in the a-axis direction of each of the first primary particles disposed in the first center portion.

In one implementation of the positive electrode active material precursor, each of the first center portion and the first surface portion has a layered structure (R-3m space group) including a first lithium layer made only of lithium and a first transition metal layer made only of a transition metal.

Another aspect of the present disclosure provides a positive electrode active material produced by mixing the positive electrode active material precursor according to one of claims 1 to 3 with a lithium compound and sintering the mixture, wherein the positive electrode active material includes a second secondary particle as an aggregate of a plurality of second primary particles, wherein the positive electrode active material includes a second center portion as a portion adjacent to a center of the positive electrode active material, and a second surface portion constituting an outer face of the positive electrode active material and surrounding the second center portion, wherein each of the second center portion and the second surface portion includes lithium, nickel, oxygen, M1 and M2, wherein M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V) and titanium (Ti) or mixtures thereof, wherein M2 has a content in a range of 0.5 mol % to 10 mol %.

In one implementation of the positive electrode active material, M2 has a content in a range of 0.5 mol % to 2 mol %.

In one implementation of the positive electrode active material, a concentration of M2 of the second center portion is lower than a concentration of M2 of the second surface portion.

In one implementation of the positive electrode active material, a concentration of M2 of the second surface portion has a concentration gradient in which a concentration increases as the second surface portion extends outwardly from the second center portion.

In one implementation of the positive electrode active material, the positive electrode active material represented by a following Chemical Formula 3:

$$Li_aNi_{1-b-c}M1_bM2_cO_{2-d}$$ <Chemical Formula 3> where M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V), titanium (Ti) or mixtures thereof, $0.8 \leq a \leq 1.1$, $0 < b \leq 0.2$, $0.001 \leq c \leq 0.05$, and $0 \leq d \leq 2$.

In one implementation of the positive electrode active material, a percentage of a thickness of the second surface portion with respect to an average radius of the positive electrode active material is in a range of 2% to 20%.

In one implementation of the positive electrode active material, the positive electrode active material includes a first lithium layer made only of lithium, a first transition metal layer made only of a transition metal, a second lithium layer in which at least a portion of the lithium constituting the first lithium layer is regularly substituted with a transition metal, and a second transition metal layer in which at least a portion of the transition metal of the first transition metal layer is regularly substituted with lithium, wherein each of the second center portion and the second surface portion includes the first lithium layer and the first transition metal layer, wherein the second surface portion further includes a cation ordering in which the second lithium layer and the second transition metal layer are alternately and regularly stacked one on top of the other.

In one implementation of the positive electrode active material, a lattice formed by the second lithium layer and the second transition metal layer includes a superlattice in which a length of an a-axis is larger by two times than a length of an a-axis of a lattice formed by the first lithium layer and the first transition metal layer, wherein the superlattice includes 6 lithium elements and 1 transition metal element.

In one implementation of the positive electrode active material, that a length in an a-axis direction of each of the second primary particles is different from a length in a c-axis direction thereof, wherein a length in the a-axis direction of each of the second primary particles disposed in the second surface portion is larger than a length in the a-axis direction of each of the second primary particles disposed in the second center portion.

In one implementation of the positive electrode active material, a length in an a-axis direction of each of the second primary particles is different from a length in a c-axis direction thereof, wherein aspect ratios of the second primary particles as a ratio of a length in an a-axis direction thereof to a length in a c-axis direction thereof increase as the second primary particle extends from the second center portion to the second surface portion.

In one implementation of the positive electrode active material, the positive electrode active material includes a concentration-constant portion in which a concentration of each of nickel and M1 is constant, and a concentration-gradient portion in which a concentration of at least one of nickel and M1 has a gradient, wherein a concentration of M2 has a gradient along the concentration-constant portion and the concentration-gradient portion.

In one implementation of the positive electrode active material, an average concentration of M2 in the concentration-gradient portion is higher than an average concentration of M2 in the concentration-constant portion.

In one implementation of the positive electrode active material, the concentration-constant portion belongs to in the second center portion, wherein the concentration-gradient portion belongs to the second surface portion, wherein a concentration of nickel in the concentration-gradient portion decreases as the concentration-gradient portion extends from an inner portion of the positive electrode active material toward a surface thereof, wherein a concentration of each of M1 and M2 in the concentration-gradient portion increases as the concentration-gradient portion extends from an inner portion of the positive electrode active material toward a surface thereof, wherein M1 includes cobalt (Co).

Still another aspect of the present disclosure provides a positive electrode for a secondary battery including the positive electrode active material as defined above.

Still another aspect of the present disclosure provides a lithium secondary battery comprising: a positive electrode for a secondary battery including the positive electrode active material as defined above; a negative electrode for a secondary battery; and an electrolyte.

Still another aspect of the present disclosure provides a battery module including the lithium secondary battery as defined above as a unit cell.

Still another aspect of the present disclosure provides a battery pack including the battery module, wherein the battery pack is used as a power source for a medium and large sized apparatus, wherein the medium and large sized apparatus is selected from a group consisting of an electric vehicle, a hybrid electric vehicle, a plug-in hybrid electric vehicle, and a power storage system.

Technical Effects

According to the present disclosure as described above, the positive electrode active material according to the present disclosure may include the secondary particle as aggregation of the plurality of primary particles, wherein the secondary particle may include nickel at a high content and may be doped with hetero elements.

The hetero elements may control a shape of the primary particles and the directionality of the primary particles, thereby providing the positive electrode active material that may be used stably for a long time and have high discharge capacity.

Further, the positive electrode active material according to the present disclosure may be doped with the hetero elements to improve the cycle characteristics of the positive electrode active material including the nickel at a high content. At the same time, the hetero elements may be doped thereto using a novel method, such that deterioration of the capacity characteristics due to a lower content of the hetero elements than that in a conventional case, are prevented, and the cycle characteristics are excellently improved at the same time.

BRIEF DESCRIPTION OF THE DRAWINGS

FIG. 1a is a schematic diagram of a cross-section of a positive electrode active material according to an embodiment of the present disclosure.

FIG. 1B is a diagram schematically showing movement of lithium ions in the positive electrode active material according to an embodiment of the present disclosure.

FIG. 2a is a SEM picture of a positive electrode active material according to Present Example 1 of the present disclosure.

FIG. 2b is a graph analyzing an elemental composition of a positive electrode active material precursor according to Present Example 1 of the present disclosure.

FIG. 2c is a graph analyzing an elemental composition of the positive electrode active material of Present Example 1 of the present disclosure.

FIG. 3 is a TEM photograph and a SAED pattern of a surface portion of the positive electrode active material according to Present Example 1 of the present disclosure.

FIG. 4 is a TEM photograph and a SAED pattern of the center portion of a positive electrode active material according to Present Example 2 of the present disclosure.

FIG. 5 is a graph measuring the discharge capacity of a lithium secondary battery including a positive electrode active material according to each of Present Example 1 and Comparative Example 1 of the present disclosure.

FIG. 6 is a graph measuring the lifetime characteristics of a lithium secondary battery including a positive electrode active material according to each of Present Example 1 and Comparative Example 1 of the present disclosure.

FIG. 7 is a graph measuring differential capacity based on the number of charge and discharge of a lithium secondary battery including a positive electrode active material according to each of Present Example 1 and Comparative Example 1 of the present disclosure.

FIG. 8 is a graph evaluating the thermal stability of a lithium secondary battery including a positive electrode active material according to each of Present Example 1 and Comparative Example 1 of the present disclosure.

FIG. 9 is a graph showing the capacity characteristics of each of Present Example 2 to Present Example 4 and Comparative Example 2 to Comparative Example 4 of the present disclosure.

FIG. 10 is a graph showing the cycle characteristics of each of Present Example 2 to Present Example 4 and Comparative Example 2 to Comparative Example 4 of the present disclosure.

FIG. 11 is an SEM image showing a cross-section of a precursor according to Present Example 6 of the present disclosure.

FIG. 13 is a graph showing the capacity characteristics of each of Present Example 5, Present Example 6, and Comparative Example 5 of the present disclosure.

FIG. 14 is a graph showing the cycle characteristics of each of Present Example 5, Present Example 6, and Comparative Example 5 of the present disclosure.

FIG. 15 is a graph showing the capacity characteristics of each of Present Example 2, Present Example 6, and Comparative Example 5.

FIG. 16 is a graph showing the cycle characteristics of each of Present Example 2, Present Example 6, Comparative Example 2, and Comparative Example 5.

FIG. 17 is a graph showing the capacity characteristics of each of Present Example 7 to Present Example 9 and Comparative Example 6 and Comparative Example 7 of the present disclosure.

FIG. 18 is a graph showing the cycle characteristics of each of Present Example 7 to Present Example 9 and Comparative Example 6 and Comparative Example 7 of the present disclosure.

FIG. 19 is a graph showing the capacity characteristics of each of Present Example 10 and Comparative Example 8.

FIG. 20 is a graph showing the cycle characteristics of each of Present Example 10 and Comparative Example 8.

FIG. 21 is a graph showing the capacity characteristics of each of Present Example 10 and Comparative Example 9.

FIG. 22 is a graph showing the cycle characteristics of each of Present Example 10 and Comparative Example 9.

FIG. 23 is a SEM image showing a cross-section of a precursor of Present Example 11.

FIG. 24 is a SEM image showing a cross section of a positive electrode active material, which is a sintered product of Present Example 11.

FIG. 25a and FIG. 25b are SEM images of the positive electrode active material as a sintered product of each of Comparative Example 11 (left) and Present Example 11 (right).

FIG. 26 is a graph showing an elemental composition of each of a precursor and a positive electrode active material as a sintered product of each of Comparative Example 10 and Present Example 11.

FIG. 27 is a graph showing the capacity characteristics of each of Present Example 11, Comparative Example 10, and Comparative Example 11.

FIG. 28 is a graph showing the cycle characteristics of each of Present Example 11, Comparative Example 10, and Comparative Example 11.

DETAILED DESCRIPTIONS

Figure 12:
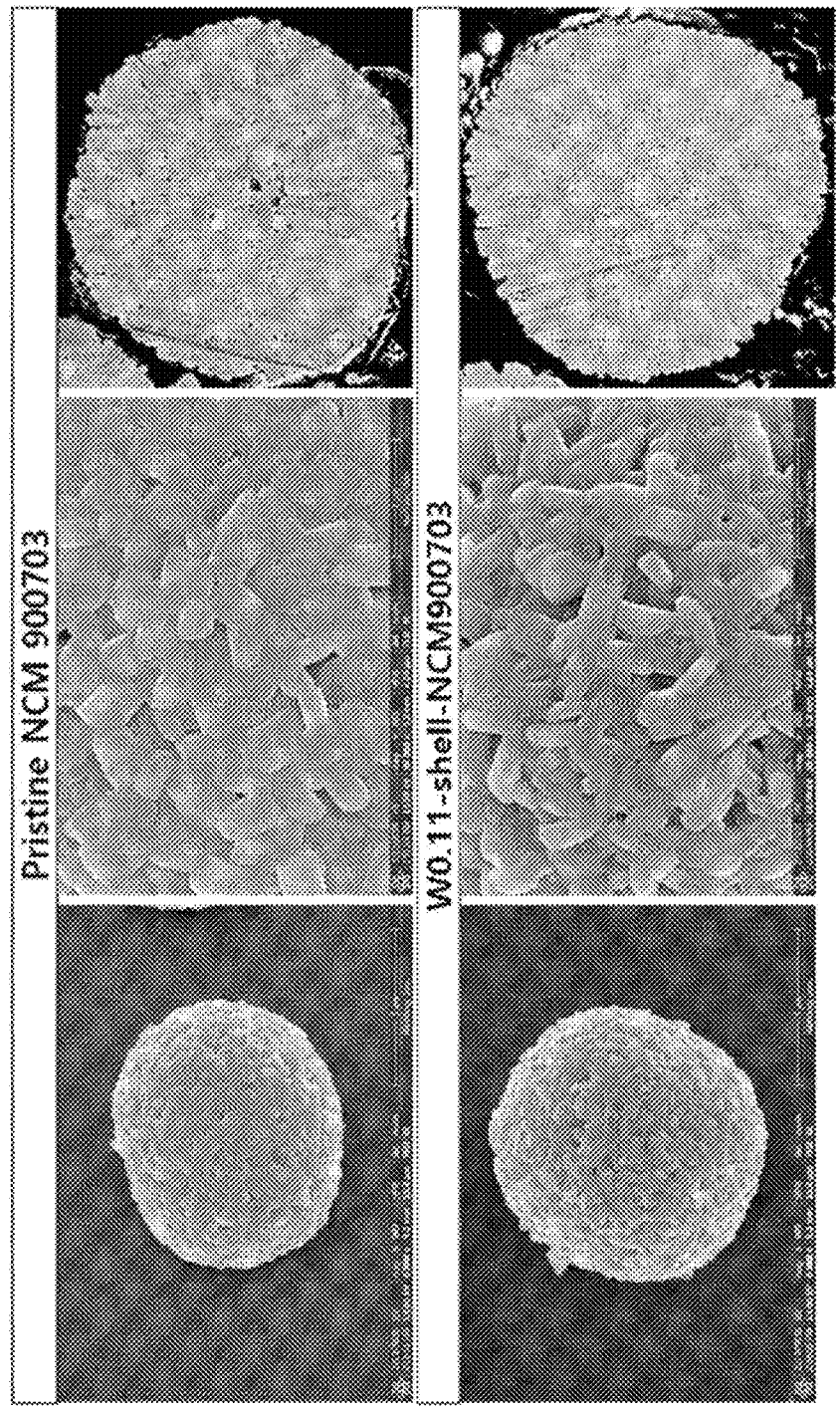
FIG. 12 is a SEM image of a positive electrode active material which is a sintered product of each of Present Example 6 and Comparative Example 5.

The specific details of other embodiments are included in the detailed description and drawings.

Advantages and features of the present disclosure, and a method to achieve the same will become apparent with reference to the embodiments described below in detail in conjunction with the accompanying drawings. However, the present disclosure is not limited to the embodiments disclosed below and may be implemented in a variety of different forms. Unless otherwise specified in following descriptions, all of numbers, values, and/or expressions indicating ingredients, reaction conditions, and contents of ingredients in the present disclosure are, in essence, approximations thereof based on various uncertainties in measurements which occur in obtaining the numbers, values, and/or expressions. Thus, the numbers, values and/or expressions should be understood as being modified by a term "about" in all instances. Further, where a numerical range is disclosed in the present description, the range is continuous and includes a minimum value and a maximum value of the range, unless otherwise indicated. Further, where the number or the value refers to an integer, the range includes all of integers included between the minimum and the maximum of the range, unless otherwise indicated.

Further, in the present disclosure, when a variable is included in a range, the variable will be understood to include all values within a stated range including stated endpoints of the range. For example, a range of "5 to 10" includes values of 5, 6, 7, 8, 9, and 10, as well as any subranges such as 6 to 10, 7 to 10, 6 to 9, 7 to 9, etc. It will be understood that the variable includes any value between valid integers in a stated range such as 5.5, 6.5, 7.5, 5.5 to 8.5, and 6.5 to 9, etc. For example, a range "10% to 30%" includes all of integer values such as 10%, 11%, 12%, 13%, 30%, etc. as well as any subranges such as 10% to 15%, 12% to 18%, or 20% to 30%, etc. It will be understood that the range includes any value between valid integers within the stated range such as 10.5%, 15.5%, 25.5%, etc.

In one embodiment, a size and a particle diameter of each of various particles such as primary particles, secondary particles, etc. may be represented as an average value of measurements from a measurement method thereof. However, the present disclosure may be limited thereto. Conventionally, a mode diameter expressing the maximum value of the distribution, a median diameter corresponding to a median value of the integral distribution curve, and various average diameters (number average, length average, area average, mass average, volume average, etc.) may be employed. In the present disclosure, unless otherwise specified, the average size and the average particle diameter may refer to a number average size and diameter, and D50 (a particle diameter at a point where the distribution percentage is 50%) may be measured.

According to one aspect of the present disclosure, the present disclosure provides a positive electrode active material precursor including a first secondary particle as collection of a plurality of first primary particles, wherein the positive electrode active material precursor includes a first center portion made of a material represented by a following Chemical Formula 1, and a first surface portion made of a material represented by the following Chemical Formula 2, wherein a percentage of a thickness of the first surface portion with respect to an average radius of the positive electrode active material precursor is in a range of 2% to 20%:

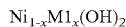   <Chemical Formula 1>

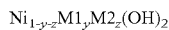   <Chemical Formula 2> where M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V), titanium (Ti) or mixtures thereof, and $0 \leq x \leq 0.2$, $0 \leq y \leq 0.2$, $0.005 \leq z \leq 0.1$.

In one implementation of the positive electrode active material precursor, a length in an a-axis direction of each of the first primary particles different from a length in a c-axis direction thereof, wherein a length in the a-axis direction of each of the first primary particles disposed in the first surface portion is larger than a length in the a-axis direction of each of the first primary particles disposed in the first center portion.

In the positive electrode active material precursor according to this embodiment, the first secondary particle may have a substantially spherical shape, and each of the first primary particles may have a rod shape in which a length in the a-axis direction thereof is different from a length in the c-axis direction thereof. At least some of the first primary particles may be arranged in a radial direction, and the a-axis direction of the first primary particles may be oriented toward the center of the first secondary particle, and the first primary particles may be oriented in a direction from the center of the positive electrode active material to the surface thereof. Further, the first primary particles in the surface portion may be highly oriented than the first primary particles in the center portion of the first secondary particle may be. The length in the a-axis direction of each of the first primary particles in the surface portion may be larger than that of each of the first primary particles in the center portion. Specifically, the lengths in the a-axis direction of the first primary particles may increase as the first secondary particle extends from the center portion toward the surface portion.

In the positive electrode active material precursor according to an embodiment of the present disclosure, the first center portion and the first surface portion may be made of different materials having different chemical formulas. In the positive electrode active material precursor, each of the first center portion and the first surface portion has a layered structure (R-3m space group) including a first lithium layer made only of lithium and a first transition metal layer made only of a transition metal. For example, in the positive electrode active material precursor, the first center portion and the first surface portion may be made of different materials having different chemical formulas, while each of the first center portion and the first surface portion may have the same layered structure as a crystal structure. Further, even though the first center portion and the first surface portion are made of materials having different Chemical Formulas, the first primary particles disposed in the first center portion and the first primary particles disposed in the second surface portion may not have different shapes, but may have the rod shape and thus may have continuity.

FIG. 1a is a schematic diagram of a cross-section of a positive electrode active material according to an embodiment of the present disclosure, and FIG. 1B is a diagram schematically showing movement of lithium ions in a positive electrode active material according to an embodiment of the present disclosure.

Referring to FIG. 1a and FIG. 1B, the present disclosure provides a positive electrode active material produced by mixing the aforementioned positive electrode active material precursor with a lithium compound and sintering the mixture, wherein the positive electrode active material includes a second secondary particle 100 as an aggregate of a plurality of second primary particles 10, wherein the positive electrode active material includes a second center portion as a portion adjacent to a center of the positive electrode active material, and a second surface portion constituting an outer face of the positive electrode active material and surrounding the second center portion.

Each of the second center portion and the second surface portion includes lithium, nickel, oxygen, M1 and M2, wherein M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V) and titanium (Ti) or mixtures thereof, wherein M2 has a content in a range of 0.5 mol % to 10 mol %.

Specifically, M2 may have a content in a range of about 0.55 mol % to 10 mol %, about 0.6 mol % to 10 mol %, about 0.65 mol % to 10 mol %, about 0.7 mol % to 10 mol %, about 0.75 mol % to 10 mol %, about 0.8 mol % to 10 mol %, about 0.85 mol % to 10 mol %, about 0.9 mol % to 10 mol %, about 0.95 mol % to 10 mol %, or about 0.5 mol % to 9.5 mol %, about 0.5 mol % to 9 mol %, about 0.5 mol % to 8.5 mol %, about 0.5 mol % to 8 mol %, about 0.5 mol % to 7.5 mol %, about 0.5 mol % to 7 mol %, about 0.5 mol % to 6.5 mol %, about 0.5 mol % to 6 mol %, about 0.5 mol % to 5.5 mol %, or about 0.5 mol % to 5 mol %. Further, M2 may have a content in a range of about 1 mol % to 10 mol %, about 2 mol % to 10 mol %, about 3 mol % to 10 mol %, about 4 mol % to 10 mol %, or about 5 mol % to 10 mol %. More specifically, M2 may have a content in a range of about 0.5 mol % to 2 mol %.

In the positive electrode active material, a concentration of M2 in the second center portion may be lower than a concentration of M2 in the second surface portion. Specifically, the concentration of M2 in the second surface portion may have a concentration gradient such that the concentration thereof increases as the second secondary particle 100 extends outwardly from the second center portion.

The positive electrode active material may be represented by a following Chemical Formula 3:

$Li_aNi_{1-b-c}M1_bM2_cO_{2-d}$ <Chemical Formula 3> where M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V), titanium (Ti) or mixtures thereof $0.8 \le a \le 1.1$, $0 < b \le 0.2$, $0.001 \le c \le 0.05$, and $0 \le d \le 2$.

Specifically, b may be $0 \le b \le 0.18$, $0 \le b \le 0.15$, $0 \le b \le 0.13$, $0 \le b \le 0.1$, $0 \le b \le 0.07$, $0 \le b \le 0.05$ or $0 \le b \le 0.03$, c may be $0.001 \le c \le 0.045$, $0.001 \le c \le 0.04$, $0.001 \le c \le 0.035$, $0.001 \le c \le 0.03$, $0.001 \le c \le 0.025$, $0.001 \le c \le 0.02$, $0.001 \le c \le 0.015$, or $0.001 \le c \le 0.012$.

In one implementation of the positive electrode active material, a percentage of a thickness of the second surface portion with respect to an average radius of the positive electrode active material may be in a range of 2% to 20%. Specifically, the percentage of a thickness of the second surface portion with respect to an average radius of the positive electrode active material may be in a range of about 2.5% to 20%, about 3% to 20%, about 4% to 20%, about 5% to 20%, about 6% to 20%, about 7% to about 7% 20%, about 8% to 20%, about 9% to 20%, about 10% to 20%, or about 2% to 19%, about 2% to 18%, about 2% to 17%, about 2% to 16%, about 2% to 15%, about 2% to 14%, about 2% to 13%, about 2% to 12%, about 2% to 11%, or about 2% to 10%.

In one implementation of the positive electrode active material, the positive electrode active material includes a first lithium layer made only of lithium, a first transition metal layer made only of a transition metal, a second lithium layer in which at least a portion of the lithium constituting the first lithium layer is regularly substituted with a transition metal, and a second transition metal layer in which at least a portion of the transition metal of the first transition metal layer is regularly substituted with lithium, wherein each of the second center portion and the second surface portion includes the first lithium layer and the first transition metal layer, wherein the second surface portion further includes a cation ordering in which the second lithium layer and the second transition metal layer are alternately and regularly stacked one on top of the other.

In one implementation of the positive electrode active material, a lattice formed by the second lithium layer and the second transition metal layer includes a superlattice in which a length of an a-axis is larger by two times than a length of an a-axis of a lattice formed by the first lithium layer and the first transition metal layer, wherein the superlattice includes 6 lithium elements and 1 transition metal element.

Specifically, in the positive electrode active material precursor according to an embodiment of the present disclosure, each of the first center portion and the first surface portion may be composed only of the first lithium layer and the first transition metal layer. In this connection, the first center portion and the first surface portion are made of materials having different chemical formulas. Specifically, in the positive electrode active material precursor, the first center portion is not doped with the hetero elements, while the first surface portion is doped with the hetero elements.

To the contrary, in the positive electrode active material produced by mixing the positive electrode active material precursor with a lithium compound and sintering the mixture, the Chemical Formulas of the materials of the second center portion and the second surface portion may be substantially similar to each other. Specifically, in the positive electrode active material, a compound constituting a substantial portion of the positive electrode active material may have a concentration gradient in at least a portion thereof, or may have a constant concentration in at least a portion thereof, or may have a concentration gradient across an entirety thereof, or may have a bulk state in which the concentration has an uncontrolled state across an entirety thereof.

The hetero elements present only in the second surface portion may be diffused to the second center portion, and the hetero elements may have a concentration gradient as the second secondary particle extends from at least a portion of the second center portion to the second surface portion. Specifically, the hetero elements doped only in the first surface portion in the positive electrode active material precursor may be present in both the second center portion and the second surface portion in the positive electrode active material. More specifically, the concentration of each of the hetero elements disposed in the second surface portion in the positive electrode active material may increase as the second secondary particle extends from the center of the second secondary particle to the outermost face.

Referring to FIG. 1a, the length in the a-axis direction of each of the second primary particles 10 may be different from the length in the c-axis direction thereof, wherein a length in the a-axis direction of each of the second primary particles 10 disposed in the second surface portion may be larger than a length in the a-axis direction of each of the second primary particles 10 disposed in the second center portion.

The second primary particles 10 may have rod shapes in which aspect ratios of the rod shapes of the second primary particles 10 as a ratio of a length in an a-axis direction thereof to a length in a c-axis direction thereof increase as the second primary particle 100 extends from the second center portion to the second surface portion. The orientation (orientation of the a-axis direction of the second primary particles 10 in a direction from the surface of the second secondary particle toward the center thereof) of the second primary particles 10 disposed in the second surface portion may be greater compared to that in the second center portion, such that lithium ions may easily move from the outer face of the second secondary particle 100 to the inside thereof.

In one implementation of the positive electrode active material, a length in an a-axis direction of each of the second primary particles 10 is different from a length in a c-axis direction thereof, wherein the aspect ratios of the second primary particles 10 as a ratio of a length in an a-axis direction thereof to a length in a c-axis direction thereof may increase as the second primary particle 100 extends from the second center portion to the second surface portion.

In one implementation of the positive electrode active material, the positive electrode active material includes a concentration-constant portion in which a concentration of each of nickel and M1 is constant, and a concentration-gradient portion in which a concentration of at least one of nickel and M1 has a gradient, wherein a concentration of M2 has a gradient along the concentration-constant portion and the concentration-gradient portion. In one implementation of the positive electrode active material, an average concentration of M2 in the concentration-gradient portion is higher than an average concentration of M2 in the concentration-constant portion.

In one implementation of the positive electrode active material, the concentration-constant portion belongs to in the second center portion, wherein the concentration-gradient portion belongs to the second surface portion, wherein a concentration of nickel in the concentration-gradient portion decreases as the concentration-gradient portion extends from an inner portion of the positive electrode active material toward a surface thereof, wherein a concentration of each of M1 and M2 in the concentration-gradient portion increases as the concentration-gradient portion extends from an inner portion of the positive electrode active material toward a surface thereof, wherein M1 may include cobalt (Co).

Still another aspect of the present disclosure provides a positive electrode for a secondary battery including the positive electrode active material as defined above.

Still another aspect of the present disclosure provides a lithium secondary battery comprising: a positive electrode for a secondary battery including the positive electrode active material as defined above; a negative electrode for a secondary battery; and an electrolyte.

Still another aspect of the present disclosure provides a battery module including the lithium secondary battery as defined above as a unit cell.

Still another aspect of the present disclosure provides a battery pack including the battery module, wherein the battery pack is used as a power source for a medium and large sized apparatus, wherein the medium and large sized apparatus is selected from a group consisting of an electric vehicle, a hybrid electric vehicle, a plug-in hybrid electric vehicle, and a power storage system.

According to still yet another aspect of the present disclosure, the present disclosure provides a method for producing a positive electrode active material, wherein the method includes preparing a first metal solution containing nickel, a second metal solution containing M1, and a third metal solution containing M2; inputting and first co-precipitating the first metal solution and the second metal solution into a co-precipitation reactor to produce a pre-precursor; inputting the first metal solution and the second metal solution in the co-precipitation reactor in which the pre-precursor has been produced, and at the same time, further adding the third metal solution thereto, and thus producing a positive electrode active material precursor in which a first surface portion is formed on an outer face of the pre-precursor; and mixing the positive electrode active material precursor with a lithium compound and then sintering the mixture to produce a positive electrode active material.

The pre-precursor includes a first center portion made of a material represented by the following Chemical Formula 1, the positive electrode active material precursor includes the first surface portion surrounding the first center portion, and made of a material represented by a following Chemical Formula 2, wherein the positive electrode active material is represented by a following Chemical Formula 3, wherein a percentage of a thickness of the first surface portion with respect to an average radius of the positive electrode active material precursor is in a range of 2% to 20%.

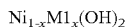  <Chemical Formula 1>

$Ni_{1-x}M1_x(OH)_2$

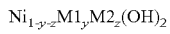  <Chemical Formula 2>

$Ni_{1-y-z}M1_yM2_z(OH)_2$

  <Chemical Formula 3>

$Li_aNi_{1-b-c}M1_bM2_cO_{2-d}$

Where M1 is cobalt (Co), manganese (Mn), aluminum (Al) or mixtures thereof, M2 is tungsten (W), molybdenum (Mo), magnesium (Mg), calcium (Ca), titanium (Ti), vanadium (V), chromium (Cr), iron (Fe), copper (Cu), zinc (Zn), gallium (Ga), strontium (Sr), yttrium (Y), zirconium (Zr), niobium (Nb), ruthenium (Ru), fluorine (F), barium (Ba) or mixtures thereof, $0 \le x \le 0.2$, $0 \le y \le 0.2$, $0.005 \le z \le 0.1$, $0.8 \le a \le 1.1$, $0 < b \le 0.2$, $0.001 \le c \le 0.05$, and $0 \le d < 2$.

Hereinafter, Present Examples and Comparative Examples of the present disclosure are described. However, the following examples are only preferred examples of the present disclosure, but the scope of the right of the present disclosure is not limited to the following examples.

1. Producing Positive Electrode Active Material

Present Example 1 (W0.5-CSG NCM NCW 89)

Each of a nickel sulfate aqueous solution (NiSO$_4$6H$_2$O, Samchun Chemicals), a manganese sulfate aqueous solution (MnSO$_4$H$_2$O, Samchun Chemicals), and a cobalt sulfate aqueous solution (CoSO$_4$7H$_2$O, Samchun Chemicals) was prepared. Separately, WO$_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn).

After putting 10 liters of distilled water into a co-precipitation reactor (capacity 40 L), N$_2$ gas was supplied to the reactor at a rate of 6 liters/minute. The reactor was stirred at 350 rpm while maintaining the temperature thereof at 40 degrees C. The nickel sulfate aqueous solution (NiSO$_4$6H$_2$O, Samchun Chemicals) and the manganese sulfate aqueous solution (MnSO$_4$H$_2$O, Samchun Chemicals) were mixed with each other in a molar ratio of nickel (Ni) and manganese (Mn) of 96:4 to produce a first metal solution with a 2M concentration. The nickel sulfate aqueous solution (NiSO$_4$6H$_2$O, Samchun Chemicals) and cobalt sulfate aqueous solution (CoSO$_4$7H$_2$O, Samchun Chemicals) were mixed with each other at a molar ratio of nickel (Ni) and cobalt (Co) at 83:17 to produce a second metal solution with a 2M concentration.

We continuously introduced the produced first metal solution at 0.561 liters/hour and ammonia solution (NH$_4$OH, JUNSEI) of 16M concentration at 0.08 liters/hour into the reactor for 24 hours, respectively to perform a first co-precipitation reaction. Then, we continuously introduced the second metal solution at 0.561 liters/hour and the doping element solution at 0.08 liters/hour, respectively, into the reactor for 2 hours to perform a second co-precipitation reaction. The pH in the reactor was identified during the first and second co-precipitation reaction using the first metal solution and the second metal solution. The pH in the reactor was adjusted to be maintained at 11.4 by adding NaOH (aq.) solution thereto.

In the co-precipitation reactor, the first and second co-precipitation reactions were performed. In the course of the reaction, nanoparticle hydroxide was first formed, and then nickel-cobalt-manganese-tungsten hydroxide was slowly accumulated on the surface of the nanoparticle hydroxide, thereby forming micro-sized particles. Then, the produced particles were washed several times using distilled water, and were subjected to filtration using a filter, and were vacuum dried in a dry oven at 110° C. for 12 hours. Thus, [$Ni_{0.96}Mn_{0.04}$](OH)$_2$ (core, average diameter 9 μm)-[$Ni_{0.82}Co_{0.17}W_{0.01}$](OH)$_2$ (shell) precursor having an average diameter of 11 μm was produced.

The produced precursor was filtered and was washed several times with distilled water, and was dried in a vacuum dryer at 110° C. for 12 hours to produce powders. The precursor in powder form was uniformly mixed with LiOH·H$_2$O so that a molar ratio of Li:(Ni+Co+Mn+W) was 1.01:1. Then, the mixture was heated at a temperature increase rate of 2° C./min and was maintained at 450° C. for 5 hours to perform preliminary sintering. Subsequently, the preliminary sintering result was sintered at 750° C. for 10 hours to obtain Li[$Ni_{0.885}Co_{0.09}Mn_{0.02}W_{0.005}$]O$_2$ (W0.5-CSG NCM NCW 89) positive electrode active material powder.

Comparative Example 1 (CSG89)

A second metal solution of a 2M concentration was produced by mixing nickel sulfate aqueous solution (NiSO$_4$6H$_2$O, Samchun Chemicals) and cobalt sulfate aqueous solution (CoSO$_4$7H2O, Samchun Chemicals) with each other at a molar ratio of nickel (Ni) and cobalt (Co) at 82:18. A subsequent process was performed in the same manner as in Present Example 1 except for performing the second co-precipitation reaction using the second metal solution as produced above. Thus, [$Ni_{0.96}Mn_{0.04}$](OH)$_2$ (core)-[$Ni_{0.82}Co_{0.18}$](OH)$_2$(shell) precursor of an average diameter of 10 μm was produced and then Li[$Ni_{0.89}Co_{0.055}Mn_{0.055}$]O$_2$(CSG89) positive electrode active material powder was obtained.

An average composition of each of all of elements of the positive electrode active material according to each of Present Example 1 and Comparative Example 1 and the concentration of tungsten in the precursor thereof before the sintering are shown in Table 1 below A unit is mol %.

tungsten was not present. In Present Example 1, in the precursor thereof before the sintering, tungsten was present at a concentration of 1 mol % only in a portion with a thickness of 1 μm from the outermost face. That is, in Present Example 1, the average concentration of tungsten in the precursor thereof before the sintering is 0.5 mol %, but the average concentration of tungsten in a region from the outermost face to the inner 1 μm position is 1 mol %, and actually a substantial amount of tungsten is present in a region from the outermost face to the inner 1 μm position.

Present Example 2 (W0.125-shell-NCM90)

A nickel sulfate aqueous solution (NiSO$_4$6H$_2$O, Samchun Chemicals), a manganese sulfate aqueous solution (MnSO$_4$H$_2$O, Samchun Chemicals), and a cobalt sulfate aqueous solution (CoSO$_4$7H$_2$O, Samchun Chemicals) were prepared, respectively. Separately, WO$_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn).

10 liters of distilled water was put into the co-precipitation reactor (capacity 47 L, the output power of the rotary motor greater than 750W), and then N$_2$ gas was supplied to the reactor at a rate of 6 liters/minute. The reactor was stirred at 350 rpm while maintaining the temperature at 45° C. The nickel sulfate aqueous solution (NiSO$_4$6H$_2$O, Samchun Chemicals), cobalt sulfate aqueous solution (CoSO$_4$7H$_2$O, Samchun Chemicals), and manganese sulfate aqueous solution (MnSO$_4$H$_2$O, Samchun Chemicals) were mixed with each other such that the molar ratio of nickel (Ni), cobalt (Co) and manganese (Mn) became 90:5:5. Thus, a metal solution with a 2M concentration was produced. We continuously added the produced metal solution at 0.561 liter/hour, 16M concentration of ammonia solution (NH$_4$OH, JUNSEI) at 0.08 L/hour, and 4M concentration of sodium hydroxide solution (NaOH, Samchun Chemicals) at 0.60 L/hour to the reactor for 24 hours, respectively. The first co-precipitation reaction was performed. We further added the doping element solution thereto. Thus, the second co-precipitation reaction was performed for 0.5 hour. While maintaining the pH in the co-precipitation reactor in the range of 10 to 12, the co-precipitation reaction was performed to produce $Ni_{0.9}Co_{0.05}Mn_{0.05}$(OH)$_2$(core, average

TABLE 1

| | | positive electrode active material | | | | precursor |
| --- | --- | --- | --- | --- | --- | --- |
| Examples | | Ni | Co | Mn | W | W |
| Present Example 1 | W0.5-CSG NCM NCW 89 | 88.5 | 9.0 | 2.0 | 0.5 | 1 (present only in a thickness 1 μm portion from an outermost face) |
| Comparative Example 1 | CSG89 | 89 | 5.5 | 5.5 | — | — |

Hereinafter, the outermost face thickness means an average length in a direction from the outermost face of the secondary particle of the precursor or the positive electrode active material toward a center thereof.

In Table 1, in both Present Example 1 and Comparative Example 1, the concentration of each of metal elements in the core portion of the precursor is constant, and at least one of the metal elements in the shell portion has a concentration gradient. As shown in Table 1, in Comparative Example 1, diameter 10 μm)-$Ni_{0.891}Co_{0.0495}Mn_{0.0495}W_{0.01}$(OH)$_2$ precursor with an average diameter of 10.4 μm.

The produced precursor was filtered and was washed several times with distilled water, and was dried in a vacuum dryer at 110° C. for 12 hours to produce powders. The precursor produced in powder form and lithium hydroxide (LiOH) were mixed with each other at a molar ratio of 1:1.01, and the mixture was heated at a temperature increase rate of 2° C./min, and was maintained at 450° C. for 5 hours to perform preliminary sintering. Subsequently, the preliminary sintering result was sintered at 750° C. for 10 hours to obtain Li[Ni$_{0.899}$Co$_{0.049875}$Mn$_{0.049875}$W$_{0.00125}$]O$_2$ (W0.125-shell-NCM90) positive electrode active material powder.

Present Example 3 (W0.25-shell-NCM90)

A process was performed in the same manner as in Present Example 2 except for performing the second co-precipitation reaction for 1 hour. Thus, Ni$_{0.9}$Co$_{0.05}$Mn$_{0.05}$(OH)$_2$(core, average diameter 10 μm)-Ni$_{0.891}$Co$_{0.0495}$Mn$_{0.0495}$W$_{0.01}$(OH)$_2$ precursor of an average diameter of 11 μm was produced. Then, Li[Ni$_{0.89775}$Co$_{0.049875}$Mn$_{0.049875}$W$_{0.0025}$]O$_2$ (W0.25-shell-NCM90) positive electrode active material powder was produced using the produced precursor.

Present Example 4 (W0.5-shell-NCM90)

A process was performed in the same manner as in Present Example 2 except for performing the second co-precipitation reaction for 2 hour. Thus, Ni$_{0.9}$ Co$_{0.05}$Mn$_{0.05}$ (OH)$_2$ (core, average diameter 10 μm)-Ni$_{0.891}$Co$_{0.0495}$Mn$_{0.0495}$W$_{0.01}$(OH)$_2$ precursor with an average diameter of 12.6 μm was produced. Then, Li[Ni$_{0.8955}$Co$_{0.04975}$Mn$_{0.4975}$W$_{0.005}$]O$_2$ (W0.5-shell-NCM90) positive electrode active material powder was produced using the produced precursor.

Comparative Example 2 (NCM90)

A process was performed in the same manner as in Present Example 2 except that the second co-precipitation reaction was not performed. Thus, Ni$_{0.9}$Co$_{0.05}$Mn$_{0.05}$(OH)$_2$ precursor with an average diameter of 10 μm was produced. Then, Li[Ni$_{0.90}$Co$_{0.05}$Mn$_{0.05}$]O$_2$ (NCM90) positive electrode active material powder was produced using the produced precursor.

Comparative Example 3 (W0.5-NCM90)

A process was performed in the same manner as in Present Example 1 except that the second co-precipitation reaction was not performed and a mixed solution as described below was used as the metal solution in the process of performing the first co-precipitation reaction. Thus, Ni$_{0.8955}$Co$_{0.04975}$Mn$_{0.04975}$W$_{0.005}$(OH)$_2$ precursor having an average diameter of 10 μm was produced. Then, Li[Ni$_{0.8955}$Co$_{0.04975}$Mn$_{0.04975}$W$_{0.005}$]O$_2$ (W0.5-NCM90) positive electrode active material powder was produced using the produced precursor.

As the metal solutions, each of a nickel sulfate aqueous solution (NiSO$_4$6H$_2$O, Samchun Chemicals), a manganese sulfate aqueous solution (MnSO$_4$H$_2$O, Samchun Chemicals), and a cobalt sulfate aqueous solution (CoSO$_4$7H$_2$O, Samchun Chemicals) was prepared. Separately, WO$_3$ in powder form was added to 4.0 mol/L of NaOH (aq.) and dissolved therein at 0.02 M to produce a doping element solution (an amount of NaOH was 2 mol with respect to a total number of moles of Ni, Co. Mn). The nickel sulfate aqueous solution (NiSO$_4$6H$_2$O, Samchun Chemicals), manganese sulfate aqueous solution (MnSO$_4$H$_2$O, Samchun Chemicals), cobalt sulfate aqueous solution (CoSO$_4$7H$_2$O, Samchun Chemicals) and the doping element solution were mixed with each other such that the molar ratio of nickel (Ni), cobalt (Co), manganese (Mn) and tungsten (W) was 90:4.525:4.525:0.05. Thus, a metal solution having a 2M concentration was produced.

Comparative Example 4 (W1.0-NCM90)

A process was performed in the same manner as in Present Example 1 except that the second co-precipitation reaction was not performed and a mixed solution as described below was used as the metal solution in the process of performing the first co-precipitation reaction. Thus, Ni$_{0.891}$Co$_{0.0495}$Mn$_{0.0495}$W$_{0.01}$(OH)$_2$ precursor having an average diameter of 10 μm was produced. Then, Li[Ni$_{0.891}$Co$_{0.0495}$Mn$_{0.0495}$W$_{0.01}$]O$_2$ (W1.0-NCM90) positive electrode active material powder was produced using the produced precursor.

As the metal solutions, each of a nickel sulfate aqueous solution (NiSO$_4$6H$_2$O, Samchun Chemicals), a manganese sulfate aqueous solution (MnSO$_4$H$_2$O, Samchun Chemicals), and a cobalt sulfate aqueous solution (CoSO$_4$7H$_2$O, Samchun Chemicals) was prepared. Separately, WO$_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn). The nickel sulfate aqueous solution (NiSO$_4$6H$_2$O, Samchun Chemicals), manganese sulfate aqueous solution (MnSO$_4$H$_2$O, Samchun Chemicals), cobalt sulfate aqueous solution (CoSOd7H$_2$O, Samchun Chemicals) and the doping element solution were mixed with each other such that the molar ratio of nickel (Ni), cobalt (Co), manganese (Mn) and tungsten (W) was 90:4.55:4.55:0.1. Thus, a metal solution having a 2M concentration was produced.

An average composition of each of all of elements of the positive electrode active material according to each of Present Example 2 to Present Example 4 and Comparative Example 2 to Comparative Example 4 and the concentration of tungsten in the precursor thereof before the sintering are shown in Table 2 below. The unit is mol %.

TABLE 2

| Examples | | positive electrode active material | | | | precursor |
|---|---|---|---|---|---|---|
| | | Ni | Co | Mn | W | W |
| Present Example 2 | W0.125-shell-NCM90 | 89.9 | 4.9875 | 4.9875 | 0.125 | 1 (present only in a thickness 0.25 μm portion from an outermost face) |
| Present Example 3 | W0.25-shell-NCM90 | 89.775 | 4.9875 | 4.9875 | 0.25 | 1 (present only in a thickness 0.5 μm portion from an outermost face) |
| Present Example 4 | W0.5-shell-NCM90 | 89.55 | 4.975% | 4.975 | 0.5 | 1 (present only in a thickness 1 μm portion from an outermost face) |

TABLE 2-continued

| Examples | positive electrode active material | | | | precursor |
|---|---|---|---|---|---|
| | Ni | Co | Mn | W | W |
| Comparative Example 2 NCM90 | 90 | 5 | 5 | — | — |
| Comparative Example 3 W0.5-NCM90 | 89.55 | 4.975 | 4.975 | 0.5 | 0.5 |
| Comparative Example 4 W1.0-NCM90 | 89.1 | 4.95 | 4.95 | 1.0 | 1 |

As shown in Table 2, tungsten was not present in Comparative Example 2, and in Comparative Examples 3 and 4, 0.5 mol % and 1 mol % of tungsten were uniformly present in the precursor step, respectively. In Present Example 2 to Present Example 4, the precursor was present at a concentration of 1 mol % only in portions of the thickness 0.25 μm, 0.5 μm, and 1 μm, respectively, from the outermost face. That is, in Present Example 2, Present Example 3 and Present Example 4, the average concentrations of tungsten in the precursor thereof before the sintering were 0.125 mol %, 0.25 mol %, and 0.5 mol %, respectively, while the average concentration of tungsten in the inner 1 μm portion from the outermost face was 1 mol %. Thus, it may be identified that actually, a substantial amount of tungsten was present only in the inner 1 μm portion from the outermost face.

Present Example 5 (W0.05-shell-NCM900703)

Each of a nickel sulfate aqueous solution ($NiSO_4 6H_2O$, Samchun Chemicals), a manganese sulfate aqueous solution ($MnSO_4H_2O$, Samchun Chemicals), and a cobalt sulfate aqueous solution ($CoSO_4 7H_2O$, Samchun Chemicals) was prepared. Separately, $WO_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn).

10 liters of distilled water was put into the co-precipitation reactor (capacity 47 L, the output power of the rotary motor greater than 750W), and then $N_2$ gas was supplied to the reactor at a rate of 6 liters/minute. The reactor was stirred at 350 rpm while maintaining the temperature at 45° C. The nickel sulfate aqueous solution ($NiSO_4 6H_2O$, Samchun Chemicals), cobalt sulfate aqueous solution ($CoSO_4 7H_2O$, Samchun Chemicals), and manganese sulfate aqueous solution ($MnSO_4H_2O$, Samchun Chemicals) were mixed with each other such that the molar ratio of nickel (Ni), cobalt (Co) and manganese (Mn) became 90:7:3. Thus, a metal solution with a 2M concentration was produced. We continuously added the produced metal solution at 0.561 liter/hour, 16M concentration of ammonia solution ($NH_4OH$, JUNSEI) at 0.08 L/hour, and 4M concentration of sodium hydroxide solution (NaOH, Samchun Chemicals) at 0.60 L/hour to the reactor for 24 hours, respectively. The first co-precipitation reaction was performed. We further added the doping element solution thereto. Thus, the second co-precipitation reaction was performed for 12 minutes. While maintaining the pH in the co-precipitation reactor in the range of 10 to 12, the co-precipitation reaction was performed to produce $Ni_{0.9}Co_{0.07}Mn_{0.03}(OH)_2$(core, average diameter 10 μm)-$Ni_{0.891}Co_{0.0693}Mn_{0.0297}W_{0.01}(OH)_2$ precursor with an average diameter of 10.2 μm.

The produced precursor was filtered and was washed several times with distilled water, and was dried in a vacuum dryer at 110° C. for 12 hours to produce powders. The precursor produced in powder form and lithium hydroxide (LiOH) were mixed with each other at a molar ratio of 1:1.01, and the mixture was heated at a temperature increase rate of 2° C./min, and was maintained at 450° C. for 5 hours to perform preliminary sintering. Subsequently, the preliminary sintering result was sintered at 750° C. for 10 hours to obtain $Li[N_{0.89955}Co_{0.069965}Mn_{0.029985}W_{0.0005}]O_2$ (W0.05-shell-NCM900703) positive electrode active material powder.

Present Example 6 (W0.11-shell-NCM900703)

A process was performed in the same manner as in Present Example 5 except that the second co-precipitation reaction was performed for 26.4 minutes. Thus, $Ni_{0.9}Co_{0.07}Mn_{0.03}(OH)_2$(core, average diameter 10 μm)-$Ni_{0.891}Co_{0.0693}Mn_{0.0297}W_{0.01}(OH)_2$ precursor with an average diameter of 10.4 μm was produced. Then, $Li[Ni_{0.89901}Co_{0.069923}Mn_{0.029967}W_{0.0011}]O_2$ (W0.11-shell-NCM90) positive electrode active material powder was produced using the produced precursor.

Comparative Example 5 (NCM 900703)

A process was performed in the same manner as in Present Example 5 except that the second co-precipitation reaction was not performed. Thus, $Ni_{0.9}Co_{0.07}Mn_{0.03}(OH)_2$ precursor with an average diameter of 10 μm was produced. Then, $Li[Ni_{0.90}Co_{0.07}Mn_{0.03}]O_2$ (NCM 900703) positive electrode active material powder was produced using the produced precursor.

An average composition of each of all of elements of the positive electrode active material according to each of Present Example 5, Present Example 6, and Comparative Example 5, and the concentration of tungsten in the precursor thereof before the sintering are shown in Table 3 below. The unit is mol %.

TABLE 3

| Examples | | positive electrode active material | | | | precursor |
|---|---|---|---|---|---|---|
| | | Ni | Co | Mn | W | W |
| Present Example 5 | W0.05-shell-NCM900703 | 89.955 | 6.9965 | 2.9985 | 0.05 | 1 (present only in a thickness 0.1 μm portion from an outermost face) 1 (present only in a |

TABLE 3-continued

| | | positive electrode active material | | | | precursor |
|---|---|---|---|---|---|---|
| Examples | | Ni | Co | Mn | W | W |
| Present Example 6 | W0.11-shell-NCM900703 | 89.901 | 6.9923 | 2.9967 | 0.11 | thickness 0.2 μm portion from an outermost face) |
| Comparative Example 5 | NCM 900703 | 90 | 7 | 3 | — | — |

As shown in Table 3, Comparative Example 5 was free of tungsten in both the precursor and the positive electrode active material. In Present Example 5 and Present Example 6, the precursor was present at a concentration of 1 mol % in only the thickness of 0.1 μm and 0.2 μm portions, respectively, from the outermost face. That is, in Present Example 5 and Present Example 6, the average concentrations of tungsten in the precursor thereof before the sintering were 0.05 mol % and 0.11 mol %, respectively, and the average concentration of tungsten in the inner 1 μm portion from the outermost face was 1 mol %. Thus, it may be identified that actually, a substantial amount of tungsten was present only in the inner 1 μm portion from the outermost face.

Present Example 7 (W0.125-shell-NCM811)

Each of a nickel sulfate aqueous solution ($NiSO_4 6H_2O$, Samchun Chemicals), a manganese sulfate aqueous solution ($MnSO_4 H_2O$, Samchun Chemicals), and a cobalt sulfate aqueous solution ($CoSO_4 7H_2O$, Samchun Chemicals) was prepared. Separately, $WO_3$ in powder form was added to 4.0 mol/L of NaOH (aq.) and was dissolved therein at 0.02 M to produce a doping element solution (an amount of NaOH was 2 mol with respect to a total number of moles of Ni, Co, Mn).

10 liters of distilled water was put into the co-precipitation reactor (capacity 47 L, the output power of the rotary motor greater than 750W), and then $N_2$ gas was supplied to the reactor at a rate of 6 liters/minute. The reactor was stirred at 350 rpm while maintaining the temperature at 45° C. The nickel sulfate aqueous solution ($NiSO_4 6H_2O$, Samchun Chemicals), cobalt sulfate aqueous solution ($CoSO_4 7H_2O$, Samchun Chemicals), and manganese sulfate aqueous solution ($MnSO_4 H_2O$, Samchun Chemicals) were mixed with each other such that the molar ratio of nickel (Ni), cobalt (Co) and manganese (Mn) became 80:10:10. Thus, a metal solution with a 2M concentration was produced. We continuously added the produced metal solution at 0.561 liter/hour, 16M concentration of ammonia solution ($NH_4OH$, JUNSEI) at 0.08 L/hour, and 4M concentration of sodium hydroxide solution (NaOH, Samchun Chemicals) at 0.60 L/hour to the reactor for 24 hours, respectively. The first co-precipitation reaction was performed. We further added the doping element solution thereto. Thus, the second co-precipitation reaction was performed for 12 minutes. While maintaining the pH in the co-precipitation reactor in the range of 10 to 12, the co-precipitation reaction was performed to produce $Ni_{0.8}Co_{0.1}Mn_{0.1}(OH)_2$ (core, average diameter 10 μm)-$Ni_{0.792}Co_{0.099}Mn_{0.099}W_{0.01}(OH)_2$ precursor with an average diameter of 10.4 μm.

The produced precursor was filtered and was washed several times with distilled water, and was dried in a vacuum dryer at 110° C. for 12 hours to produce powders. The precursor produced in powder form and lithium hydroxide (LiOH) were mixed with each other at a molar ratio of 1:1.01, and the mixture was heated at a temperature increase rate of 2° C./min, and was maintained at 450° C. for 5 hours to perform preliminary sintering. Subsequently, the preliminary sintering result was sintered at 750° C. for 10 hours to obtain $Li[Ni_{0.799}Co_{0.099875}Mn_{0.099875}W_{0.00125}]O_2$ (W0.125-shell-NCM811) positive electrode active material powder.

Present Example 8 (W0.25-shell-NCM811)

A process was performed in the same manner as in Present Example 7 except for performing the second co-precipitation reaction for 1 hour. Thus, $Ni_{0.8}Co_{0.1}Mn_{0.1}(OH)_2$(core, average diameter 10 μm)-$Ni_{0.792}Co_{0.099}Mn_{0.099}W_{0.01}(OH)_2$ precursor with an average diameter of 11 μm was produced. Then, $Li[Ni_{0.798}Co_{0.09975}Mn_{0.09975}W_{0.0025}]O_2$ (W0.25-shell-NCM811) positive electrode active material powder was produced using the produced precursor.

Present Example 9 (W0.35-shell-NCM811)

A process was performed in the same manner as in Present Example 7 except for performing the second co-precipitation reaction for 1 hour and 24 minutes. Thus, $Ni_{0.8}Co_{0.01}Mn_{0.1}(OH)_2$(core, average diameter 10 μm)-$Ni_{0.792}Co_{0.099}Mn_{0.099}W_{0.01}(OH)_2$ precursor with an average diameter of 11.6 μm was produced. Then, $Li[Ni_{0.7972}Co_{0.09965}Mn_{0.09965}W_{0.0035}]O_2$ (W0.35-shell-NCM811) positive electrode active material powder was produced using the produced precursor.

Comparative Example 6 (NCM811)

A process was performed in the same manner as in Present Example 7 except that the second co-precipitation reaction was not performed. Thus, $Ni_{0.8}Co_{0.1}Mn_{0.1}(OH)_2$ precursor with an average diameter of 10 μm was produced. Then, $Li[Ni_{0.80}Co_{0.1}Mn_{0.1}]O_2$ (NCM811) positive electrode active material powder was produced using the produced precursor.

Comparative Example 7 (W0.75-NCM811)

A process was performed in the same manner as in Present Example 7 except that only the first co-precipitation reaction was performed without performing the second co-precipitation reaction, and the mixed solution as described below was used as the metal solution in the first co-precipitation reaction. Thus, $Ni_{0.794}Co_{0.09925}Mn_{0.09925}W_{0.0075}(OH)_2$ precursor with an average diameter of 10 μm was produced. Then, $Li[Ni_{0.794}Co_{0.09925}Mn_{0.09925}W_{0.0075}]O_2$ (W0.75-NCM811) positive electrode active material powder was produced using the produced precursor.

As the metal solutions, each of a nickel sulfate aqueous solution ($NiSO_4 6H_2O$, Samchun Chemicals), a manganese sulfate aqueous solution ($MnSO_4 H_2O$, Samchun Chemicals), and a cobalt sulfate aqueous solution ($CoSO_4 7H_2O$, Samchun Chemicals) was prepared. Separately, $WO_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn). The nickel sulfate aqueous solution ($NiSO_4 6H_2O$, Samchun Chemicals), manganese sulfate aqueous solution ($MnSO_4 H_2O$, Samchun Chemicals), cobalt sulfate aqueous solution ($CoSO_4 7H_2O$, Samchun Chemicals) and the doping element solution were mixed with each other such that the molar ratio of nickel (Ni), cobalt (Co), manganese (Mn) and tungsten (W) was 80:9.9625:9.9625:0.075. Thus, a metal solution having a 2M concentration was produced.

An average composition of each of all of elements of the positive electrode active material according to each of Present Example 7 to Present Example 9, Comparative Example 6, and Comparative Example 7 and the concentration of tungsten in the precursor thereof before the sintering are shown in Table 4 below. The unit is mol %.

TABLE 4

| Examples | | positive electrode active material | | | | precursor |
|---|---|---|---|---|---|---|
| | | Ni | Co | Mn | W | W |
| Present Example 7 | W0.125-shell-NCM811 | 79.9 | 9.9875 | 9.9875 | 0.125 | 1 (present only in a thickness 0.25 μm portion from an outermost face) |
| Present Example 8 | W0.25-shell-NCM811 | 79.8 | 9.975 | 9.975 | 0.25 | 1 (present only in a thickness 0.5 μm portion from an outermost face) |
| Present Example 9 | W0.35-shell-NCM811 | 79.72 | 9.965 | 9.965 | 0.35 | 1 (present only in a thickness 0.7 μm portion from an outermost face) |
| Comparative Example 6 | NCM811 | 80 | 10 | 10 | — | — |
| Comparative Example 7 | W0.75-NCM811 | 79.4 | 9.925 | 9.925 | 0.75 | 0.75 |

As shown in Table 4, in Comparative Example 6, tungsten was not present in both the precursor and the positive electrode active material. In Comparative Example 6, tungsten was present in a uniform concentration in both the precursor and the positive electrode active material. In Present Example 7 to Present Example 9, the precursor was present at a concentration of 1 mol % only in the thickness of 0.25 μm, 0.5 μm, and 0.7 μm portions, respectively, from the outermost face. That is, in Present Example 7, Present Example 8, and Present Example 9, the average concentrations of tungsten in the precursor thereof before the sintering were 0.125 mol %, 0.25 mol %, and 0.35 mol %, respectively, while the average concentration of tungsten in the inner 1 μm portion from the outermost face was 1 mol %. Thus, it may be identified that actually, a substantial amount of tungsten was present only in the inner 1 μm portion from the outermost face.

Present Example 10 (W0.5-shell-CSG)

A nickel sulfate aqueous solution ($NiSO_4 6H_2O$, Samchun Chemicals), a manganese sulfate aqueous solution ($MnSO_4 H_2O$, Samchun Chemicals), and a cobalt sulfate aqueous solution ($CoSO_4 7H_2O$, Samchun Chemicals) were prepared, respectively. Separately, $WO_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn).

10 liters of distilled water was put into the co-precipitation reactor (capacity 40 L), and then $N_2$ gas was supplied to the reactor at a rate of 6 liters/minute. The reactor was stirred at 350 rpm while maintaining the temperature of the reactor at 40° C. The first metal solution with a 2M concentration composed only of the nickel sulfate aqueous solution ($NiSO4 6H_2O$, Samchun Chemicals) was produced. The nickel sulfate aqueous solution ($NiSO_4 6H_2O$, Samchun Chemicals), cobalt sulfate aqueous solution ($CoSO_4 7H_2O$, Samchun Chemicals), and manganese sulfate aqueous solution ($MnSO_4 H_2O$, Samchun Chemicals) were mixed with each other such that the molar ratio of nickel (Ni), cobalt (Co) and manganese (Mn) became 80:10:10. Thus, the second metal solution with a 2M concentration was produced.

We continuously introduced the produced first metal solution at 0.561 liters/hour and ammonia solution ($NH_4OH$, JUNSEI) of 16M concentration at 0.08 liters/hour into the reactor for 24 hours, respectively to perform a first co-precipitation reaction. Then, we continuously introduced the second metal solution at 0.561 liters/hour and the doping element solution at 0.08 liters/hour, respectively, into the reactor for 2 hours to perform a second co-precipitation reaction. The pH in the reactor was identified during the first and second co-precipitation reaction using the first metal solution and the second metal solution. The pH in the reactor was adjusted to be maintained at 11.4 by adding NaOH (aq.) solution thereto.

In the co-precipitation reactor, the first and second co-precipitation reactions were performed. In the course of the reaction, nanoparticle hydroxide was first formed, and then nickel-cobalt-manganese-tungsten hydroxide was slowly accumulated on the surface of the nanoparticle hydroxide, thereby forming micro-sized particles. Then, the produced particles were washed several times using distilled water, and were subjected to filtration using a filter, and were vacuum dried in a dry oven at 110° C. for 12 hours. Thus, $Ni(OH)_2$(core, average diameter 9 μm)-[$Ni_{0.792}Co_{0.099}W_{0.099}](OH)_2$ (shell) precursor having an average diameter of 11 μm was produced.

The produced precursor was filtered and was washed several times with distilled water, and was dried in a vacuum dryer at 110° C. for 12 hours to produce powders. The precursor in powder form was uniformly mixed with LiOH·H$_2$O so that a molar ratio of Li:(Ni+Co+Mn+W) was 1.01:1. Then, the mixture was heated at a temperature increase rate of 2° C./min and was maintained at 450° C. for 5 hours to perform preliminary sintering. Subsequently, the preliminary sintering result was sintered at 730° C. for 10 hours to obtain Li[Ni$_{0.8955}$Co$_{0.04975}$Mn$_{0.04975}$W$_{0.005}$]O$_2$ (W0.5-shell-CSG) positive electrode active material powder.

Comparative Example 8 (W0.5-Core Portion-CSG)

A nickel sulfate aqueous solution (NiSO$_4$6H$_2$O, Samchun Chemicals), a manganese sulfate aqueous solution (MnSO$_4$H$_2$O, Samchun Chemicals), and a cobalt sulfate aqueous solution (CoSO$_4$7H$_2$O, Samchun Chemicals) were prepared, respectively. Separately, WO$_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn).

10 liters of distilled water was put into the co-precipitation reactor (capacity 40 L), and then N$_2$ gas was supplied to the reactor at a rate of 6 liters/minute. The reactor was stirred at 350 rpm while maintaining the temperature of the reactor at 40° C. The first metal solution with a 2M concentration composed only of the nickel sulfate aqueous solution (NiSO$_4$6H$_2$O, Samchun Chemicals) was produced. The nickel sulfate aqueous solution (NiSO$_4$6H$_2$O, Samchun Chemicals), cobalt sulfate aqueous solution (CoSO$_4$7H$_2$O, Samchun Chemicals), and manganese sulfate aqueous solution (MnSO$_4$H$_2$O, Samchun Chemicals) were mixed with each other such that the molar ratio of nickel (Ni), cobalt (Co) and manganese (Mn) became 80:10:10. Thus, the second metal solution with a 2M concentration was produced.

We continuously introduced the produced first metal solution at 0.561 liters/hour and the doping element solution at 0.08 liters/hour into the reactor for 24 hours, respectively to perform a first co-precipitation reaction. At this time, the molar ratio of nickel and tungsten was set to 99:1. Then, we continuously introduced the second metal solution at 0.561 liters/hour and the ammonia solution (NH$_4$OH, JUNSEI) of 16M concentration at 0.08 liters/hour, respectively, into the reactor for 2 hours to perform a second co-precipitation reaction. The pH in the reactor was identified during the first and second co-precipitation reaction using the first metal solution and the second metal solution. The pH in the reactor was adjusted to be maintained at 11.4 by adding NaOH (aq.) solution thereto.

In the co-precipitation reactor, the first and second co-precipitation reactions were performed. In the course of the reaction, nanoparticle hydroxide was first formed, and then nickel-cobalt-manganese-tungsten hydroxide was slowly accumulated on the surface of the nanoparticle hydroxide, thereby forming micro-sized particles. Then, the produced particles were washed several times using distilled water, and were subjected to filtration using a filter, and were vacuum dried in a dry oven at 110° C. for 12 hours. Thus, [Ni$_{0.99}$W$_{0.01}$](OH)$_2$(core, average diameter 9 μm)-[Ni$_{0.8}$Co$_{0.1}$Mn$_{0.1}$](OH)$_2$ (shell) precursor having an average diameter of 11 μm was produced.

The produced precursor was filtered and was washed several times with distilled water, and was dried in a vacuum dryer at 110° C. for 12 hours to produce powders. The precursor in powder form was uniformly mixed with LiOH·H$_2$O so that a molar ratio of Li:(Ni+Co+Mn+W) was 1.01:1. Then, the mixture was heated at a temperature increase rate of 2° C./min and was maintained at 450° C. for 5 hours to perform preliminary sintering. Subsequently, the preliminary sintering result was sintered at 730° C. for 10 hours to obtain Li[Ni$_{0.8955}$Co$_{0.04975}$Mn$_{0.04975}$W$_{0.005}$]O$_2$ (W0.5-core-CSG) positive electrode active material powder.

Comparative Example 9 (W0.5-CSG90)

A nickel sulfate aqueous solution (NiSO$_4$6H$_2$O, Samchun Chemicals), a manganese sulfate aqueous solution (MnSO$_4$H$_2$O, Samchun Chemicals), and a cobalt sulfate aqueous solution (CoSO$_4$7H$_2$O, Samchun Chemicals) were prepared, respectively. Separately, WO$_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn).

10 liters of distilled water was put into the co-precipitation reactor (capacity 40 L), and then N$_2$ gas was supplied to the reactor at a rate of 6 liters/minute. The reactor was stirred at 350 rpm while maintaining the temperature of the reactor at 40° C. The first metal solution with a 2M concentration composed only of the nickel sulfate aqueous solution (NiSO$_4$6H$_2$O, Samchun Chemicals) was produced. The nickel sulfate aqueous solution (NiSO$_4$6H$_2$O, Samchun Chemicals), cobalt sulfate aqueous solution (CoSO$_4$7H$_2$O, Samchun Chemicals), and manganese sulfate aqueous solution (MnSO$_4$H$_2$O, Samchun Chemicals) were mixed with each other such that the molar ratio of nickel (Ni), cobalt (Co) and manganese (Mn) became 0.792:0.099:0.099. Thus, the second metal solution with a 2M concentration was produced.

We continuously introduced the produced first metal solution at 0.561 liters/hour and the doping element solution at 0.08 liters/hour into the reactor for 24 hours, respectively to perform a first co-precipitation reaction. Then, we continuously introduced the second metal solution at 0.561 liters/hour and the doping element solution at 0.08 liters/hour, respectively, into the reactor for 2 hours to perform a second co-precipitation reaction. The pH in the reactor was identified during the first and second co-precipitation reaction using the first metal solution and the second metal solution. The pH in the reactor was adjusted to be maintained at 11.4 by adding NaOH (aq.) solution thereto.

In the co-precipitation reactor, the first and second co-precipitation reactions were performed. In the course of the reaction, nanoparticle hydroxide was first formed, and then nickel-cobalt-manganese-tungsten hydroxide was slowly accumulated on the surface of the nanoparticle hydroxide, thereby forming micro-sized particles. Then, the produced particles were washed several times using distilled water, and were subjected to filtration using a filter, and were vacuum dried in a dry oven at 110° C. for 12 hours. Thus, [Ni$_{0.99}$W$_{0.01}$](OH)$_2$(core, average diameter 9 μm)-[Ni$_{0.792}$Co$_{0.099}$Mn$_{0.099}$W$_{0.01}$](OH)$_2$ (shell) precursor having an average diameter of 11 μm was produced.

The produced precursor was filtered and was washed several times with distilled water, and was dried in a vacuum dryer at 110° C. for 12 hours to produce powders. The precursor in powder form was uniformly mixed with LiOH·H$_2$O so that a molar ratio of Li:(Ni+Co+Mn+W) was 1.01:1. Then, the mixture was heated at a temperature increase rate of 2° C./min and was maintained at 450° C. for 5 hours to perform preliminary sintering. Subsequently, the preliminary sintering result was sintered at 730° C. for 10 hours to obtain Li[Ni$_{0.8955}$Co$_{0.04975}$Mn$_{0.04975}$W$_{0.005}$]O$_2$ (W0.5-CSG90) positive electrode active material powder.

An average composition of each of all of elements of the positive electrode active material according to each of Present Example 10, Comparative Example 8, and Comparative Example 9, and the concentration of tungsten in the precursor thereof before the sintering are shown in a following Table 5. The unit is mol %.

TABLE 5

| Examples | | positive electrode active material | | | | precursor |
| --- | --- | --- | --- | --- | --- | --- |
| | | Ni | Co | Mn | W | W |
| Present Example 10 | W0.5-shell-CSG | 89.55 | 4.975 | 4.975 | 0.5 | 1 (present only in a thickness 1 μm portion from an outermost face) |
| Comparative Example 8 | W0.5-central portion-CSG | 89.55 | 4.975 | 4.975 | 0.5 | 1 (present only in an inner radius 4.5 μm portion) |
| Comparative Example 9 | W0.5-CSG90 | 89.55 | 4.975 | 4.975 | 0.5 | 0.5 |

As shown in Table 5, in each of Comparative Example 8, Comparative Example 9, and Present Example 10, a concentration of the metal element in the core portion of the precursor is constant, and a concentration of at least one of the metal elements in the shell portion has a concentration gradient. In Comparative Example 8, tungsten was present in a uniform concentration in the core (average radius of 1 μm) of the precursor. In Present Example 10, tungsten was present at a concentration of 1 mol % only in the 1 μm thickness portion from the outermost face of the precursor. In Comparative Example 9, tungsten was uniformly present throughout the precursor. That is, in Present Example 10, the average concentration of tungsten in the precursor thereof before the sintering is 0.5 mol %, while the average concentration of tungsten in the inner 1 μm portion from the outermost face is 1 mol %, and actually, a substantial amount of tungsten was present only in the inner 1 μm portion from the outermost face. Further, unlike Present Example 10, in Comparative Example 8, the average concentration of tungsten in the precursor thereof before the sintering is 0.5 mol %, while actually, a substantial amount of tungsten was present only in only in a portion of an inner radius of 4.5 μm of the precursor. In Comparative Example 9, it may be identified that the average concentration of tungsten was 0.5 mol % and uniform throughout each of the precursor and the positive electrode active material as the sintered product.

Present Example 11 (Mol-Shell-NC90)

A nickel sulfate aqueous solution (NiSO$_4$6H$_2$O, Samchun Chemicals), a manganese sulfate aqueous solution (MnSO$_4$H$_2$O, Samchun Chemicals), and a cobalt sulfate aqueous solution (CoSO$_4$7H$_2$O, Samchun Chemicals) were prepared, respectively. Separately, WO$_3$ in powder form was added to 4.0 mol/L of NaOH (aq.) and was dissolved therein at 0.02 M to produce a doping element solution (an amount of NaOH was 2 mol with respect to a total number of moles of Ni, Co. Mn).

10 liters of distilled water was put into the co-precipitation reactor (capacity 47 L, the output power of the rotary motor greater than 750W), and then N$_2$ gas was supplied to the reactor at a rate of 6 liters/minute. The reactor was stirred at 350 rpm while maintaining the temperature at 45° C. The nickel sulfate aqueous solution (NiSO$_4$6H$_2$O, Samchun Chemicals) and the cobalt sulfate aqueous solution (CoSO$_4$7H$_2$O, Samchun Chemicals) were mixed with each other such that the molar ratio of nickel (Ni) and cobalt (Co) was 90:10 to produce a metal solution with a 2M concentration. The produced metal solution, 16M concentration of ammonia solution (NH$_4$OH, JUNSEI), and 4M concentration of sodium hydroxide solution (NaOH, Samchun Chemicals) were continuously added to the reactor at 0.561 liter/hour, at 0.08 L/hour, and at 0.60 L/hour for 24 hours, respectively. Thus, the first co-precipitation reaction was performed. The doping element solution was further added thereto. Thus, the second co-precipitation reaction was performed for 0.1 hour. While maintaining the pH in the co-precipitation reactor in the range of 10 to 12, the co-precipitation reaction was performed to produce Ni$_{0.9}$Co$_{0.1}$(OH)$_2$(core, average diameter 10 μm)-Ni$_{0.81}$Co$_{0.09}$Mo$_{0.1}$(OH)$_2$ precursor with an average diameter of 10.4 μm.

The produced precursor was filtered and was washed several times with distilled water, and was dried in a vacuum dryer at 110° C. for 12 hours to produce powders. The precursor produced in powder form and lithium hydroxide (LiOH) were mixed with each other at a molar ratio of 1:1.01, and the mixture was heated at a temperature increase rate of 2° C./min, and was maintained at 450° C. for 5 hours to perform preliminary sintering. Subsequently, the preliminary sintering result was sintered at 750° C. for 10 hours to obtain Li[Ni$_{0.81}$Co$_{0.09}$Mo$_{0.01}$]O$_2$ (Mol-shell-NC90) positive electrode active material powder.

Comparative Example 10 (NCA89)

10 liters of distilled water was put into the co-precipitation reactor (capacity 47 L, the output power of the rotary motor greater than 750W), and then N$_2$ gas was supplied to the reactor at a rate of 6 liters/minute. The reactor was stirred at 350 rpm while maintaining the temperature at 45° C. The nickel sulfate aqueous solution (NiSO$_4$6H$_2$O, Samchun Chemicals) and the cobalt sulfate aqueous solution (CoSO$_4$7H$_2$O, Samchun Chemicals) were mixed with each other such that the molar ratio of nickel (Ni) and cobalt (Co) was 9:1 to produce a metal solution with a 2M concentration. The produced metal solution, 16M concentration of ammonia solution (NH$_4$OH, JUNSEI), and 4M concentration of sodium hydroxide solution (NaOH, Samchun Chemicals) were continuously added to the reactor at 0.08 liter/hour, at 0.11 L/hour, and at 0.60 L/hour for 24 hours, respectively. While maintaining the pH in the co-precipitation reactor in the range of 10 to 12, the co-precipitation reaction was performed to produce Ni$_{0.9}$Co$_{0.1}$(OH)$_2$ precursor with an average diameter of 10 μm.

The produced precursor was filtered and was washed several times with distilled water, and was dried in a vacuum dryer at 110° C. for 12 hours to produce powders. We prepared aluminum hydroxide ($Al(OH)_3$) having the average particle size of 2 μm or smaller using a ball mill. The precursor produced in powder form, aluminum hydroxide ($Al(OH)_3$) and lithium hydroxide (LiOH) were mixed with each other in a molar ratio of 0.9995:0.00025:1.01, and the mixture was heated at a temperature increase rate of 2° C./min, and was maintained at 450° C. for 5 hours to perform preliminary sintering. Subsequently, the preliminary sintering result was sintered at 730° C. for 10 hours to obtain $Li[Ni_{0.891}Co_{0.0990}Al_{0.01}]O_2$ (NCA89) positive electrode active material powder.

Comparative Example 11 (Mol-NC90)

A process was performed in the same manner as in Present Example 10 except that the second co-precipitation reaction was not performed and a mixed solution as described below was used as the metal solution in the process of performing the first co-precipitation reaction. Thus, $Ni_{0.81}Co_{0.09}Mo_{0.01}(OH)_2$ precursor with an average diameter of 10 μm was produced. Then, $Li[Ni_{0.81}Co_{0.09}\ Mo_{0.1}(OH)_2]O_2$ (Mol-NC90) positive electrode active material powder was produced.

A nickel sulfate aqueous solution ($NiSO_4 6H_2O$, Samchun Chemicals), a manganese sulfate aqueous solution ($MnSO_4 H_2O$, Samchun Chemicals), and a cobalt sulfate aqueous solution ($CoSO_4 7H_2O$, Samchun Chemicals) were prepared, respectively. Separately, molybdenum trioxide ($MoO_3$) in powder form was added to 4.0 mol/L of NaOH (aq.) and was dissolved therein at 0.02 M (10% Mo solution) to produce a doping element solution (an amount of NaOH was 2 mol with respect to a total number of moles of Ni, Co. Mn). We inputted continuously introduced the produced metal solution at 0.561 liters/hour, ammonia solution ($NH_4OH$, JUNSEI) with 16M concentration at 0.08 liters/hour, and the doping element solution at 0.60 liters/hour into the reactor for 24 hours, respectively. Co-precipitation reaction was carried out.

An average composition of each of all of elements of the positive electrode active material according to each of Present Example 11, Comparative Example 10, and Comparative Example 11, and the concentration of molybdenum in the precursor thereof before the sintering are shown in Table 6 below. The unit is mol %.

was 1 mol %, while the average concentration of molybdenum in the inner 0.2 μm portion from the outermost face was 10 mol %. Thus, it may be identified that actually, a substantial amount of molybdenum was present only in the inner 0.2 μm portion from the outermost face.

2. Half-Cell and Full-Cell Production Using Present Examples and Comparative Examples A half-cell and a full-cell were produced using each of the above-described Present Examples and Comparative Examples as the positive electrode active material.

In order to produce the half-cell and the full-cell, the positive electrode active material in powder form (based on 1 g) as produced according to each of Present Examples and Comparative Examples, poly(vinylidene fluoride), and carbon black were added to 0.4 g of N-methyl pyrrolidone in a weight ratio of 90:4.5:5.5. The mixture was uniformly mixed. Thus, a positive electrode slurry is produced. The produced positive electrode slurry was coated on an aluminum foil. A roll press was applied thereto. Then, vacuum drying was performed on the roll pressing product to produce a positive electrode.

When producing a half cell using the produced positive electrode active material, the produced positive electrode as a slurry was coated on the aluminum foil so that a loading level of the positive electrode active material was 5 mg/cm². Thus, the positive electrode was produced. In this connection, the loading level of the positive electrode active material being 5 mg/cm² may mean that when the aluminum foil coated with the electrode active material is sampled into a square of 1 cm², a weight of only the positive electrode active material in the components of the positive electrode is 5 mg). Then, electrolyte was produced as follows: ethylene carbonate, and ethyl methyl carbonate (EC:EMC=3:7 v/v) were used as a solvent; vinylene carbonate (VC) as an additive of 2 wt % and lithium salt 1.2 mol/L $LiPF_6$ were uniformly dissolved therein. A 2032-coin-type half-cell (hereinafter, coin cell) using $Li_o$ as a negative electrode was produced.

When producing a full cell using the produced positive electrode active material, the produced positive electrode as a slurry was coated on the aluminum foil so that a loading level of the positive electrode active material was 8.5 mg/cm². Thus, the positive electrode was produced. Graphite as a slurry was coated on the copper foil so that the

TABLE 6

| | | positive electrode active material | | | | precursor |
|---|---|---|---|---|---|---|
| Examples | | Ni | Co | Al | Mo | Mo |
| Present Example 11 | Mol-shell-NC90 | 89.1 | 9.9 | — | 1 | 10 (present only in a thickness 0.2, μm portion from an outermost face) |
| Comparative Example 10 | NCA89 | 89.1 | 9.9 | 1 | — | — |
| Comparative Example 11 | Mol-NC90 | 89.1 | 9.9 | 1 | 1 | 1 |

As shown in Table 6, in Comparative Example 10, molybdenum was not present in both the precursor and the positive electrode active material, and in Comparative Example 11, tungsten was uniformly present in both the precursor and the positive electrode active material. In Present Example 11, the precursor was present at a concentration of 1 mol % only in a portion of a thickness of 2 μm from the outermost face. That is, in Present Example 11, the average concentration of molybdenum in the precursor thereof before the sintering loading level thereof was 6.5 mg/cm², followed by roll pressing and then vacuum drying to produce a negative electrode. Then, electrolyte was produced as follows: ethylene carbonate, and ethyl methyl carbonate (EC:EMC=3:7 v/v) were used as a solvent; vinylene carbonate (VC) as an additive of 2 wt % and lithium salt 1.2 mol/L $LiPF_6$ were uniformly dissolved therein. In a pouch-type battery case, the positive electrode, a separator (Celgard, model 2320) and the negative electrode were stacked. The produced electrolyte was injected thereto. The case was sealed to produce a pouch-type full cell.

3. Evaluation of Present Examples, Comparative Examples and Production Examples (1) Identification of Capacity and Cycle Characteristics Using Half-Cell The produced half-cell was charged to 4.3V and discharged to 2.7V with a constant current of 0.5 C (1 C being 180 mA/g) at 30° C., and 100 cycles were performed under the same condition as a charge/discharge test (hereinafter, 2.7V-4.3V). Thus, a recovery capacity was identified.

(2) Identification of Capacity and Cycle Characteristics Using Full Cells

The produced full-cell was charged to 4.1V and discharged to 3.0V with a constant current of 1 C at 25° C., and 100 cycles were performed under the same condition as a charge/discharge test (hereinafter, 3V-4.1V). Thus, a recovery capacity was identified.

(3) Identification of Microstructures of Metal Composite Oxide (Precursor) and Positive Electrode Active Material Using SEM The microstructure of each of the positive electrode active material according to each of the Production Examples and the metal composite oxide (precursor) before the preliminary sintering of the positive electrode active material was identified using SEM (Nova Nano SEM 450, FEI).

Hereinafter, the microstructure, surface characteristics and electrochemical characteristics of the positive electrode active material according to each of Present Examples and Comparative Examples were identified.

tration of 1 mol % of tungsten only in a portion having a thickness of 1 μm from the outermost face, and is absent a region inwardly thereof. This is because during the production process, tungsten was added only to the outermost face of the positive electrode active material precursor. To the contrary, it may be identified that tungsten diffuses inwardly after the sintering as shown in FIG. 2b. It may be identified that even when tungsten diffuses inwardly, the concentration of tungsten gradually increases as the particle extends toward the surface portion (outermost face). Referring to FIG. 2a and FIG. 2b, it may be identified that the concentration of the inner portion (core) of the positive electrode active material is constant, and all of the nickel, cobalt, and manganese have concentration gradients in the outer portion (shell).

FIG. 3 is a TEM photograph and a SAED pattern of the surface portion of the positive electrode active material according to Present Example 1 of the present disclosure, and FIG. 4 is a TEM photograph and a SAED pattern of the center portion of the positive electrode active material according to Present Example 2 of the present disclosure.

Referring to FIG. 3 and FIG. 4, TEM pictures were taken of the surface portion (shell) and the center portion (core) of the positive electrode active material according to Present Example 1. Then, a SAED pattern thereof was analyzed. It may be identified that in Present Example 1, the cation ordering of lithium and transition metal is observed in the surface portion of the positive electrode active material particle, and the center portion of the particle has a layered crystal structure.

TABLE 7

| Examples | | 0.1C, 1st Dis-Capa (mAh/g) | 1st Efficiency | 0.2C Capacity (mAh/g) | 0.2C/ 0.1C | 0.5C Capacity (mAh/g) | 0.5C/ 0.1C | 0.5C Cycle Retention | L/L (mg/cm²) |
|---|---|---|---|---|---|---|---|---|---|
| Present Example 1 | W0.5-CSG NCM NCW89 | 226.5 | 95.40% | 221.5 | 97.80% | 211.1 | 93.20% | 98.00% | 3.43 |
| Comparative Example 1 | CSG89 | 227.3 | 94.80% | 222 | 97.70% | 212.5 | 93.50% | 87.30% | 4.34 |

Table 7 is a table showing capacity and cycle characteristics according to each of Present Example 1 and Comparative Example 1. FIG. 2a is a SEM picture of the positive electrode active material according to Present Example 1 of the present disclosure. FIG. 2b is a graph analyzing the elemental composition of the positive electrode active material precursor according to Present Example 1 of the present disclosure, and FIG. 2c is a graph analyzing the elemental composition of the positive electrode active material of Present Example 1 of the present disclosure.

Referring to FIG. 2a to FIG. 2c, the elemental compositions of the positive electrode active material precursor and the positive electrode active material according to Present Example 1 were analyzed based on a distance from the particle center portion. As shown in FIG. 1 and FIG. 2, it may be identified that the average concentration of tungsten in the surface portion is higher than the average concentration of tungsten in the center portion, and the concentration of tungsten gradually decreases as the particle extends from the surface portion to the center portion.

Specifically, referring to FIG. 2a, in the positive electrode active material precursor according to Present Example 1 of the present disclosure, the tungsten is present at a concen- The positive electrode active material according to Present Example 1 includes the first lithium layer made only of lithium, the first transition metal layer made only of the transition metal, the second lithium layer in which at least a portion of lithium constituting the first lithium layer is regularly substituted with transition metal, and the second transition metal layer in which at least a portion of the transition metal of the first transition metal layer is regularly substituted with lithium. In this connection, the core portion of the positive electrode active material of Present Example 1 has only a layered crystal structure in which the first lithium layer and the first transition metal layer are alternately stacked. The shell portion thereof has not only the layered crystal structure in which the first lithium layer and the first transition metal layer are alternately stacked, but also a cation ordering structure as indicated by a round circle in which the second lithium layer and the second transition metal layer are alternately and regularly stacked.

In the second lithium layer, the lithium and the transition metal are alternately arranged with each other. In the second transition metal layer, the transition metal and the lithium are arranged alternately with each other. The lattice formed by the second lithium layer and the second transition metal layer includes the superlattice. The superlattice has 6 lithium elements and 1 transition metal element.

That is, as shown in FIG. 3, it may be identified, based on the electron diffraction pattern results of the [010] zone axis or [100] zone axis, that in the core portion, only a first diffraction point group as an unidirectional arrangement of one or more diffraction points corresponding to the lattices formed by the first lithium layer and the first transition metal layer and having a relatively high intensity is observed, while in the shell portion, not only the first diffraction point group but also a second diffraction point group as an unidirectional arrangement of one or more diffraction points corresponding to the lattices formed by the second lithium layer and the second transition metal layer and having a relatively lower intensity than that of those included in the first diffraction point group are observed.

In this connection, the first diffraction point group and the second diffraction point group are arranged alternately and regularly with each other. The first diffraction point groups and the second diffraction point groups are spaced apart from each other by the constant spacing. That is, in FIG. 3, an extra peak (circular notation) that may not be indexed in the system of the space group of R3m was identified. The extra peak (circular notation) was indicated as the second diffraction point group. The peak that was brighter relative to the second diffraction point group was indicated as the first diffraction point group.

FIG. 5 is a graph measuring the discharge capacity of a lithium secondary battery including a positive electrode active material according to each of Present Example 1 and Comparative Example 1 of the present disclosure. FIG. 6 is a graph measuring the life characteristics of a lithium secondary battery including a positive electrode active material according to each of Present Example 1 and Comparative Example 1 of the present disclosure. FIG. 7 is a graph measuring the differential capacity based on the number of charge and discharge of a lithium secondary battery including a positive electrode active material according to each of Present Example 1 and Comparative Example 1 of the present disclosure. FIG. 8 is a graph evaluating the thermal stability of a lithium secondary battery including a positive electrode active material according to each of Present Example 1 and Comparative Example 1 of the present disclosure.

Based on FIG. 5 together with Table 7, it may be identified that, even when tungsten was doped according to Present Example 1 of the present disclosure, there was no decrease in capacity, compared with Comparative Example 1 without doping. In general, in the case of doping tungsten in a high-concentration nickel condition, there is a problem in that the content of nickel is reduced due to the doped tungsten. To the contrary, according to Present Example 1, when doping only the outermost face portion with tungsten, the capacity reduction did not occur.

Referring to FIG. 6, in Comparative Example 1, the rapid decrease in capacity occurred as 100 cycles progressed. To the contrary, it may be identified that Present Example 1 exhibited excellent lifespan characteristics even at 100 cycles.

Referring to FIG. 7, the differential capacity based on the number of charge and discharge of lithium secondary batteries including the positive electrode active material according to each of Present Example 1 and Comparative Example 1 was measured. It may be identified that as charging and discharging are performed, in the lithium secondary battery including a positive electrode active material according to Comparative Example 1, the peak value is greatly reduced when a voltage is between 4.1 and 4.2V. To the contrary, it may be identified that in the lithium secondary battery containing the positive electrode active material in which tungsten is doped at a relatively high concentration only into the outermost face portion according to Present Example 1, the peak value does not change substantially when a voltage is between 4.1 and 4.2 V. That is, it may be identified that in the Present Example 1, a volume change due to contraction and expansion in the c-axis direction during the charging and discharging process was significantly reduced, such that the life characteristics were improved, compared with Comparative Example 1.

Referring to FIG. 8, DSC measurements of lithium secondary batteries including positive electrode active material according to each of Present Example 1 and Comparative Example 1 were performed. As may be identified from FIG. 7, it may be identified that the thermal characteristics of the positive electrode active material doped with tungsten according to Present Example 1 are significantly better than that of Comparative Example 1. In other words, it may be identified that performing tungsten doping is an efficient way to improve the thermal characteristics of the positive electrode active material.

TABLE 8

| Examples | Average W composition | WShell thickness (W1 %) | 0.1C, 1st Dis-Cap (mAh/g) | 1st Efficiency | 0.2C Capacity (mAh/g) | 0.2C/ 0.1C | 0.5C Capacity (mAh/g) | 0.5C/ 0.1C | 0.5C Cycle Retention (100CY) | L/L (mg/cm²) |
|---|---|---|---|---|---|---|---|---|---|---|
| Present Example 2 | W0.125-shell-NCM90 | 0.25 μm | 0.13% | 231.6 | 96.40% | 226.8 | 97.90% | 218.2 | 94.20% | 91.60% | 3.83 |
| Present Example 3 | W0.25-shell-NCM90 | 0.5 μm | 0.25% | 232.2 | 96.40% | 226.9 | 97.70% | 217.5 | 93.70% | 93.10% | 3.76 |
| Present Example 4 | W0.5-shell-NCM90 | 1 μm | 0.50% | 227.4 | 95.50% | 220.8 | 97.10% | 208.7 | 91.80% | 97.30% | 3.89 |
| Comparative Example 2 | NCM90 | — | — | 231.3 | 96.30% | 226.8 | 98.10% | 217.9 | 94.20% | 85.80% | 3.49 |
| Comparative Example 3 | W0.5-shell-NCM90 | — | 0.50% | 230.6 | 96.20% | 226 | 98.00% | 216.8 | 94.00% | 94.10% | 3.73 |
| Comparative Example 4 | W1.0-NCM90 | — | 1% | 225.8 | 95.30% | 218.7 | 96.80% | 205.8 | 91.10% | 97.80% | 3.62 |

FIG. 9 is a graph showing the capacity characteristics of each of Present Example 2 to Present Example 4 and Comparative Example 2 to Comparative Example 4 of the present disclosure, and FIG. 10 is a graph showing the cycle characteristics of each of Present Example 2 to Present Example 4 and Comparative Example 2 to Comparative Example 4 of the present disclosure.

Referring to Table 8 and FIG. 9, it may be identified that when tungsten was contained as 1 mol % in an entire area as in Comparative Example 4, the capacity was relatively lower, compared to Present Examples and other Comparative Examples. To the contrary, referring to FIG. 10, it may be identified that in Comparative Example 4, the cycle characteristics were good. That is, as in Comparative Example 4, when tungsten is added in the entire area at the content of 1 mol % based on the total amount of the positive electrode active material, the cycle characteristics are improved, while the capacity characteristics are decreased. Comparing the Comparative Example 4 with Comparative Example 2 in which no tungsten was included and Present Example 2 in which tungsten was included in a trace amount (0.13 mol %), Present Example 2 showed similar capacity characteristics to that of Comparative Example 2, and at the same time, the lifespan characteristics of Present Example 2 were greatly improved.

Further, when comparing Present Example 4 and Comparative Example 3 of the present disclosure with other, it was identified that Present Example 4 had better lifespan characteristics compared to Comparative Example 3 even though both included the same content of tungsten (0.50 mol %). That is, it may be identified that when in the precursor step, tungsten is present in the outermost face portion, improved lifespan characteristics were achieved even at a low concentration of tungsten.

secondary particle to the surface portion thereof, the length in the c-axis direction hardly changed but the length in the a-axis direction was larger in the surface portion than in the center portion. Further, it may be identified that the shapes of the primary particles and secondary particle in the precursor step were maintained to be substantially the same as the shapes of those in the positive electrode active material after the sintering at high temperature.

Referring to FIG. 12, it may be identified that in Comparative Example 5 without tungsten doping, the orientation (the a-axis direction of the primary particles was oriented toward the center portion of the secondary particles) of the primary particles located in the surface portion of the secondary particle was insignificant, compared to Present Example 6, and the primary particles were not formed in the form of a rod shape.

It may be identified that referring to Present Example 6 of the present disclosure, even when tungsten is doped only in the portion with a thickness of 0.2 μm from the outermost face, the primary particles constituting the secondary particle after sintering have rod shapes whose the aspect ratios increase, that is, the lengths in the a-axis direction increase as the secondary particle extends from the center of the secondary particle to the surface thereof.

FIG. 13 is a graph showing the capacity characteristics of each of Present Example 5, Present Example 6, and Comparative Example 5 of the present disclosure. FIG. 14 is a

TABLE 9

| Examples | | W 한량 (mol %) 전체 | 0.1C, 1st Ch- Cap (mAh/g) | 0.1C, 1st Dis- Cap (mAh/g) | 1st Effi- ciency | 0.2C Capacity (mAh/g) | 0.2C/ 0.1C | 0.5C Capacity (mAh/g) | 0.5C/ 0.1C | 0.5C Cycle Retention (100Cy) | L/L (mg/ cm2) |
|---|---|---|---|---|---|---|---|---|---|---|---|
| Comparative Example 5 | NCM 900703 | — | 240.6 | 232.3 | 96.50% | 227.1 | 97.70% | 218.8 | 94.20% | 86.60% | 4.04 |
| Present Example 5 | W0.05- shell- NCM 900703 | 0.05 | 242.6 | 233.1 | 96.10% | 230.6 | 98.90% | 221.4 | 95.00% | 91.80% | 4.08 |
| Present Example 6 | W0.11- shell- NCM 900703 | 0.11 | 242.2 | 234 | 96.60% | 231.1 | 98.80% | 222.4 | 95.10% | 95.30% | 3.71 |

FIG. 11 is an SEM image showing the cross-section of the precursor according to Present Example 6 of the present disclosure, and FIG. 12 is a SEM image showing the positive electrode active material, which is the sintered body of each of Present Example 6 and Comparative Example 5.

Referring to FIG. 11, in Present Example 6, when comparing the precursor and the positive electrode active material with each other, it may be identified that in both the precursor and the positive electrode active material, the aspect ratios (ratio of the length in the a-axis direction to the length in the c-axis direction) of the primary particles increase as the secondary particle extends from the center portion of the secondary particle to the surface portion thereof. More specifically, it may be identified that as the secondary particle extends from the center portion of the graph showing the cycle characteristics of each of Present Example 5, Present Example 6, and Comparative Example 5 of the present disclosure.

Referring to FIG. 13 and FIG. 14 along with Table 9, it may be identified that the capacity of each of Present Example 5 and Present Example 6 doped with tungsten is substantially similar to that of Comparative Example 5 without tungsten. To the contrary, it may be identified that cycle characteristics of each of Present Example 5 and Present Example 6 is excellent compared to Comparative Example 5. Thus, it may be identified that as in the Present Examples, even when cobalt content is relatively high, tungsten is added only to the outermost portion, thereby exhibiting excellent capacity characteristics and cycle characteristics.

TABLE 10

| Examples | | Wcontent (mol %) entire area | 0.1C, 1st Ch-Cap (mAh/g) | 0.1C, 1st Dis-Cap (mAh/g) | 1st Efficiency | 0.2C Capacity (mAh/g) | 0.2C/ 0.1C | 0.5C Capacity (mAh/g) | 0.5C/ 0.1C | 0.5C Cycle Retention (100Cy) | L/L (mg/cm$^2$) |
|---|---|---|---|---|---|---|---|---|---|---|---|
| Comparative Example 2 | NCM90 | — | 240.2 | 231.3 | 96.30% | 226.8 | 98.10% | 217.9 | 94.20% | 85.80% | 3.49 |
| Present Example 2 | W0.125-shell-NCM90 | 0.125 | 241.8 | 232.9 | 96.30% | 227.9 | 97.80% | 219 | 94.00% | 89.90% | 3.24 |
| Comparative Example 5 | NCM 900703 | — | 240.6 | 232.3 | 96.50% | 227.1 | 97.70% | 218.8 | 94.20% | 86.60% | 4.04 |
| Present Example 6 | W0.11-shell-NCM 900703 | 0.11 | 241.4 | 231.5 | 95.90% | 226.9 | 98.00% | 219.9 | 95.00% | 93.00% | 4.22 |

Table 10 is a table showing electrochemical values including capacity characteristics and cycle characteristics of each of Present Example 2, Present Example 6, Comparative Example 2, and Comparative Example 5. FIG. 15 is a graph showing the capacity characteristics of each of Present Example 2, Present Example 6, and Comparative Example 5, and FIG. 16 is a graph showing the cycle characteristics of each of Present Example 2, Present Example 6, Comparative Example 2, and Comparative Example 5.

Referring to Table 10 and FIG. 15, it may be identified that the capacity characteristics of Present Example 2 and Present Example 6 and Comparative Example 2 and Comparative Example 5 are substantially similar to each other.

In FIG. 16, Present Example 2 is a positive electrode active material doped with 1 mol % of tungsten only into the portion with a thickness of 0.25 μm from the outermost face of the precursor, and Present Example 6 is a positive electrode active material doped with 1 mol % of tungsten only into the portion with a thickness of 0.2 μm from the outermost face of the precursor.

Regarding a case when 90 mol % nickel is contained, Comparative Example 2 and Present Example 2 where cobalt and manganese are included in a ratio of 5:5 may be compared with each other, and Comparative Example 5 and Present Example 6 in which cobalt and manganese were included at a ratio of 7:3 may be compared with each other. Thus, it was identified based on the comparing result that cycle characteristics were excellent when tungsten was doped into the outermost face portion in both the comparing results.

Further, when comparing Present Example 2 and Present Example 6 with each other, it was identified that Present Example 6 had better cycle characteristics than Present Example 2 had. It may be identified that in the Present Examples of the present disclosure, the higher the cobalt content, the more effectively the cycle characteristics are improved. This is because cobalt whose concentration increases at the particle extends toward the surface portion, and tungsten whose concentration increases as the particle extends toward the surface portion interact with each other in the surface portion of the secondary particle having the highest concentration thereof, such that the crystal structure is stabilized and thus microcracks are prevented from occurring during the cycle, thereby preventing the penetration of the electrolyte thereto.

TABLE 11

| Examples | | 0.1C, 1st Dis-Cap (mAh/g) | 1st Efficiency | 0.2C Capacity (mAh/g) | 0.2C/ 0.1C | 0.5C Capacity (mAh/g) | 0.5C/ 0.1C | 0.5C Cycle Retention (100Cy) | L/L (mg/cm2) |
|---|---|---|---|---|---|---|---|---|---|
| Present Example 7 | W0.125-shell-NCM811 | 215.6 | 97.20% | 212.1 | 98.40% | 206.2 | 95.60% | 94.90% | 4.17 |
| Present Example 8 | W0.25-shell-NCM811 | 214.9 | 97.10% | 210.9 | 98.10% | 204.9 | 95.30% | 94.80% | 4.01 |
| Present Example 9 | W0.35-shell-NCM811 | 212.3 | 96.90% | 208.2 | 98.10% | 201.9 | 95.10% | 95.40% | 3.8 |
| Comparative Example 6 | NCM811 | 211.6 | 96.00% | 207.7 | 98.20% | 200.7 | 94.90% | 94.30% | 3.51 |
| Comparative Example 7 | W0.75-NCM811 | 212.3 | 95.00% | 207.5 | 97.70% | 198 | 93.20% | 97.20% | 3.37 |

FIG. 17 is a graph showing the capacity characteristics of each of Present Example 7 to Present Example 9 and Comparative Example 6 and Comparative Example 7 of the present disclosure, and FIG. 18 is a graph showing the cycle characteristics of each of Present Example 7 to Present Example 9 and Comparative Example 6 and Comparative Example 7 of the present disclosure.

Referring to Table 11 and FIG. 17 and FIG. 18, it may be identified that the capacities of Present Example 7 to Present Example 9 and Comparative Example 6 and Comparative Example 7 are substantially similar to each other. To the contrary, it may be identified that the cycle characteristics of only Comparative Example 6 were bad while thereof others were substantially similar to each other. That is, in Comparative Example 7, tungsten is doped into the entire area of the precursor and has a content of 0.75 mol %. However, in Present Examples 7 to 9, tungsten is doped mainly into the outermost portion of the precursor, and the content of tungsten is relatively lower than that in Comparative Example 7. However, it may be identified that the cycle characteristics of Present Examples 7 to 9 were excellent compared to Comparative Example 7.

TABLE 12

| Examples | | No. | 0.1C, 1st Dis-Cap (mAh/g) | 1st Efficiency | 0.2C Capacity (mAh/g) | 0.2C/ 0.1C | 0.5C Capacity (mAh/g) | 0.5C/ 0.1C | 0.5C Cycle Retention (100Cy) | L/L (mg/ cm2) |
|---|---|---|---|---|---|---|---|---|---|---|
| Present Example 10 | W0.5-shell-CSG | #1 | 228.4 | 96.30% | 223.3 | 97.80% | 213.3 | 93.40% | 96.90% | 3.48 |
| | | #2 | 227 | 96.20% | 222.6 | 98.10% | 213.6 | 94.10% | 96.20% | 3.36 |
| Comparative Example 8 | W0.5-central portion-CSG | #1 | 224.1 | 94.90% | 216.7 | 96.70% | 204 | 91.00% | 95.40% | 3.17 |
| | | #2 | 225.1 | 94.80% | 217.8 | 96.80% | 205.2 | 91.20% | 95.80% | 3.17 |

Table 12 is a table showing electrochemical data about Present Example 10 and Comparative Example 8. In Present Example 10 (NCM NCW 90 (90 7.5 2 0.5)), the outermost portion is doped with tungsten in the precursor producing step. In Comparative Example 8 (NCW NCM 90 (89.5 5 5 0.5)), the innermost portion is doped with tungsten in the precursor producing step. Two electrochemical evaluations were performed on each of Present Example 10 and Comparative Example 8. FIG. 19 is a graph showing the capacity characteristics of each of Present Example 10 and Comparative Example 8, and FIG. 20 is a graph showing the cycle characteristics of each of Present Example 10 and Comparative Example 8.

Referring to FIG. 19, it may be identified that the capacity characteristics of Present Example 10 in which the outermost portion is doped with tungsten with Comparative Example 8 in which the innermost portion is doped with tungsten have substantially no difference therebetween.

Referring to FIG. 20, it may be identified that Present Example 10 has superior cycle characteristics compared to Comparative Example 8. Thus, when the same amount of tungsten is doped, the cycle characteristics of Present Example 10 in which the outermost portion is doped with tungsten is excellent compared to Comparative Example 8 in which the innermost portion is doped with tungsten. This is because when the outermost portion is doped with tungsten, the crystal structure of the outermost portion is more stabilized such that the penetration of the electrolyte from the outside may be prevented during the cycle. In another aspect, this is because tungsten doped into the outermost portion of the secondary particle in the precursor step may allow the rod shapes of the primary particles constituting the secondary particle to be well defined in the outermost portion of the secondary particle, and allow the orientation of the primary particles in the outermost portion to be further improved.

Table 13 is directed to a positive electrode active material having a CSG (Core portion Shell Gradient) structure in which the core has a constant concentration of each of nickel, cobalt, and manganese, and at least one of nickel, cobalt, and manganese has a concentration gradient in the shell. In Present Example 10, tungsten is doped only into the outermost shell, and in Comparative Example 9, tungsten is doped uniformly into an entire area of the secondary particle. The average doping amounts of tungsten in Present Example 10 and Comparative Example 9 were the same as each other and were 0.5 mol %. FIG. 21 is a graph showing the capacity characteristics of each of Present Example 10 and Comparative Example 9, and FIG. 22 is a graph showing the cycle characteristics of each of Present Example 10 and Comparative Example 9.

Referring to FIG. 21, it may be identified that the capacities of Present Example 10 and Comparative Example 9 are substantially similar to each other. To the contrary, referring to FIG. 22, it may be identified that Present Example 10 is better in cycle characteristics than Comparative Example 9. That is, it may be identified that even in the positive electrode active material of the CSG structure, the case when tungsten is doped into the outermost layer was more effective in cycle characteristics than the case when tungsten is uniformly doped into the entire area.

TABLE 13

| Examples | | 0.1C, 1st Dis-Cap (mAh/g) | 1st Efficiency | 0.2C Capacity (mAh/g) | 0.2C/ 0.1C | 0.5C Capacity (mAh/g) | 0.5C/ 0.1C | 0.5C Cycle Retention (100Cy) | L/L (mg/ cm2) |
|---|---|---|---|---|---|---|---|---|---|
| Present Example 10 | W0.5-shell-CSG | 227 | 96.20% | 222.6 | 98.10% | 213.6 | 94.10% | 96.20% | 3.36 |
| Comparative Example 9 | W0.5-CSG90 | 230.5 | 97.00% | 225.5 | 97.80% | 215.6 | 93.50% | 94.20% | 3.2 |

TABLE 14

| Examples | | No. | 0.1C, 3rd Dis-Cap (mAh/g) | 1st Efficiency | 0.2C Capacity (mAh/g) | 0.2C/ 0.1C | 0.5C Capacity (mAh/g) | 0.5C/ 0.1C | 0.5C Cycle Retention (100Cy) |
|---|---|---|---|---|---|---|---|---|---|
| Present Example 11 | Mo1-shell-NC90 | #1 | 233.4 | 96.20% | 230 | 98.60% | 222.6 | 95.40% | 94.80% |
| | | #2 | 232.9 | 96.50% | 229.7 | 98.60% | 223.4 | 95.90% | 94.00% |
| Comparative Example 10 | NCA89 | #1 | 225.1 | 95.10% | 220.3 | 97.90% | 210.6 | 93.50% | 83.70% |
| Comparative Example 11 | Mo1-NC90 | #1 | 228.7 | 96.1% | 224.6 | 98.2% | 216.6 | 94.8% | 94.8% |

Table 14 shows the electrochemical characteristics of each of Present Example 11, Comparative Example 10, and Comparative Example 11. FIG. 23 is a SEM image showing the cross section of the precursor of Present Example 11, and FIG. 24 is a SEM image showing the cross section of the positive electrode active material which is the sintered body of Present Example 11. FIG. 25a and FIG. 25b are SEM images of the positive electrode active materials as sintered products of Comparative Example 11 (left) and Present Example 11 (right). FIG. 26 is a graph showing the elemental composition of the precursor of each of Comparative Example 10 and Present Example 11 and of the positive electrode active material as the sintered product thereof. FIG. 27 is a graph showing the capacity characteristics of each of Present Example 11, Comparative Example 10, and Comparative Example 11. FIG. 28 is a graph showing the cycle characteristics of each of Present Example 11, Comparative Example 10, and Comparative Example 11.

Referring to FIG. 23 and FIG. 24, it may be identified that in Present Example 11 in which only the outermost portion is doped with molybdenum (Mo), the rod shape of the primary particles in both the precursor and the sintered positive electrode active material is clear and primary particles are highly oriented. Further, in Present Example 11, the shape of the rod of the primary particles as identified in the precursor appears in the positive electrode active material after the sintering.

Referring to FIG. 25, in Comparative Example 11, an entire area is uniformly doped with molybdenum, while in Present Example 11, the outermost portion is doped with molybdenum. When the former and the latter have the same amount of molybdenum, the primary particles and secondary particle of Present Example 11 have relatively similar shapes.

Referring to FIG. 26, it may be identified that Present Example 11 has a concentration gradient in which the concentration of molybdenum after the sintering increases as the secondary particle extends toward the outermost portion.

Referring to FIG. 27 and FIG. 28, it may be identified that the capacity characteristics of Present Example 11, Comparative Example 10, and Comparative Example 11 are substantially similar to each other, whereas the cycle characteristics of Present Example 11 is superior to that of each of Comparative Example 10 and Comparative Example 11. Further, it may be identified that when the same content of molybdenum is added to Present Example 11 and Comparative Example 11, or the content of molybdenum added to Present Example 11 is lower than the content of that added to Comparative Example 11, the cycle characteristics of Present Example 11 in which the outermost portion is doped therewith is more excellent than that of Comparative Example 11 in which molybdenum is doped uniformly into the entire area.

Those of ordinary skill in the technical field to which the present disclosure belongs will be able to understand that the present disclosure may be implemented in other specific forms without changing technical idea or essential characteristics thereof. Therefore, it should be understood that the embodiments as described above are illustrative in all respects and not restrictive. The scope of the present disclosure is indicated by the following claims rather than the detailed description, and all changes or modifications derived from the meaning and scope of the claims and their equivalents are included in the scope of the present disclosure.

The invention claimed is:

1. A positive electrode active material, represented by:

$Li_aNi_{1-b-c}M1_bM2_cO_{2-d}$ where M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V), titanium (Ti) or mixtures thereof, $0.8 \leq a \leq 1.1$, $0 < b \leq 0.2$, $0.001 \leq c \leq 0.05$, and $0 \leq d \leq 2$, wherein the positive electrode active material includes a second secondary particle as an aggregate of a plurality of second primary particles, wherein the positive electrode active material includes a second center portion as a portion adjacent to a center of the positive electrode active material, and a second surface portion constituting an outer face of the positive electrode active material and surrounding the second center portion, wherein each of the second center portion and the second surface portion includes lithium, nickel, oxygen, M1 and M2, and wherein M2 has a content in a range of 0.5 mol % to 10 mol % in each of the second center portion and the second surface portion.

2. The positive electrode active material of claim 1, wherein M2 has a content in a range of 0.5 mol % to 2 mol % in each of the second center portion and the second surface portion.

3. The positive electrode active material of claim 1, wherein a concentration of M2 of the second center portion is lower than a concentration of M2 of the second surface portion.

4. The positive electrode active material of claim 1, wherein a concentration of M2 of the second surface portion has a concentration gradient in which a concentration increases as the second surface portion extends outwardly from the second center portion.

5. The positive electrode active material of claim 1, wherein a percentage of a thickness of the second surface portion with respect to an average radius of the positive electrode active material is in a range of 2% to 20%.

6. The positive electrode active material of claim 1, wherein the positive electrode active material includes:
a first lithium layer made only of lithium,
a first transition metal layer made only of a transition metal,
a second lithium layer in which at least a portion of the lithium constituting the first lithium layer is substituted with a transition metal, and
a second transition metal layer in which at least a portion of the transition metal of the first transition metal layer is substituted with lithium,
wherein each of the second center portion and the second surface portion includes the first lithium layer and the first transition metal layer, and
wherein the second surface portion further includes a cation ordering in which the second lithium layer and the second transition metal layer are alternately and stacked one on top of the other.

7. The positive electrode active material of claim 6, wherein a lattice formed by the second lithium layer and the second transition metal layer includes a superlattice in which a length of an a-axis is larger by two times than a length of an a-axis of a lattice formed by the first lithium layer and the first transition metal layer, and
wherein the superlattice includes 6 lithium elements and 1 transition metal element.

8. The positive electrode active material of claim 1, wherein that a length in an a-axis direction of each of the second primary particles is different from a length in a c-axis direction thereof, and
wherein a length in the a-axis direction of each of the second primary particles disposed in the second surface portion is larger than a length in the a-axis direction of each of the second primary particles disposed in the second center portion.

9. The positive electrode active material of claim 1, wherein a length in an a-axis direction of each of the second primary particles is different from a length in a c-axis direction thereof, and
wherein aspect ratios of the second primary particles as a ratio of a length in an a-axis direction thereof to a length in a c-axis direction thereof increase as the second primary particle extends from the second center portion to the second surface portion.

10. The positive electrode active material of claim 1, wherein the positive electrode active material includes a concentration-constant portion in which a concentration of each of nickel and M1 is constant, and a concentration-gradient portion in which a concentration of at least one of nickel and M1 has a gradient, and
wherein a concentration of M2 has a gradient along the concentration-constant portion and the concentration-gradient portion.

11. The positive electrode active material of claim 10, wherein an average concentration of M2 in the concentration-gradient portion is higher than an average concentration of M2 in the concentration-constant portion.

12. The positive electrode active material of claim 11, wherein the concentration-constant portion belongs to in the second center portion,
wherein the concentration-gradient portion belongs to the second surface portion, wherein a concentration of nickel in the concentration-gradient portion decreases as the concentration-gradient portion extends from an inner portion of the positive electrode active material toward a surface thereof,
wherein a concentration of each of M1 and M2 in the concentration-gradient portion increases as the concentration-gradient portion extends from an inner portion of the positive electrode active material toward a surface thereof, and
wherein M1 includes cobalt (Co).

13. A lithium secondary battery comprising:
a positive electrode for a secondary battery including the positive electrode active material according to claim 10; and
a negative electrode for a secondary battery; and an electrolyte.

14. A battery module including the lithium secondary battery according claim 13 as a unit cell.

15. A battery pack including the battery module according to claim 14, wherein the battery pack is used as a power source for a medium and large sized apparatus, and
wherein the medium and large sized apparatus is selected from a group consisting of an electric vehicle, a hybrid electric vehicle, a plug-in hybrid electric vehicle, and a power storage system.

16. A positive electrode active material,
wherein the positive electrode active material includes a second secondary particle as an aggregate of a plurality of second primary particles,
wherein the positive electrode active material includes a second center portion as a portion adjacent to a center of the positive electrode active material, and a second surface portion constituting an outer face of the positive electrode active material and surrounding the second center portion,
wherein each of the second center portion and the second surface portion includes lithium, nickel, oxygen, M1 and M2,
wherein M1 is cobalt (Co), manganese (Mn), aluminum (Al) or mixtures thereof, M2 is tungsten (W), molybdenum (Mo), tantalum (Ta), niobium (Nb), hafnium (Hf), silicon (Si), tin (Sn), zirconium (Zr), calcium (Ca), germanium (Ge), gallium (Ga), indium (In), ruthenium (Ru), tellurium (Te), antimony (Sb), iron (Fe), chromium (Cr), vanadium (V) and titanium (Ti) or mixtures thereof,
wherein M2 has a content in a range of 0.5 mol % to 10 mol %,
wherein the positive electrode active material includes:
a first lithium layer made only of lithium,
a first transition metal layer made only of a transition metal,
a second lithium layer in which at least a portion of the lithium constituting the first lithium layer is substituted with a transition metal, and
a second transition metal layer in which at least a portion of the transition metal of the first transition metal layer is substituted with lithium,
wherein each of the second center portion and the second surface portion includes the first lithium layer and the first transition metal layer, and
wherein the second surface portion further includes a cation ordering in which the second lithium layer and the second transition metal layer are alternately and stacked one on top of the other.

17. The positive electrode active material of claim 16, wherein a lattice formed by the second lithium layer and the second transition metal layer includes a superlattice in which a length of an a-axis is larger by two times than a length of an a-axis of a lattice formed by the first lithium layer and the first transition metal layer, and wherein the superlattice includes 6 lithium elements and 1 transition metal element.

* * * * *